(12) United States Patent
Xu et al.

(10) Patent No.: US 7,528,848 B2
(45) Date of Patent: May 5, 2009

(54) EMBEDDED INTERACTION CODE DECODING FOR A LIQUID CRYSTAL DISPLAY

(75) Inventors: An Xu, Beijing (CN); Chunhui Zhang, Beijing (CN); Jian Wang, Beijing (CN); Liyong Chen, Beijing (CN); Qiang Wang, Beijing (CN); Yingnong Dang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 11/169,744

(22) Filed: Jun. 30, 2005

(65) Prior Publication Data
US 2007/0003150 A1    Jan. 4, 2007

(51) Int. Cl.
*G09G 5/00* (2006.01)
(52) U.S. Cl. .................. 345/626; 345/87; 345/179; 382/314
(58) Field of Classification Search ............... 345/626, 345/87, 179; 382/269, 314
See application file for complete search history.

(56) References Cited

U.S. PATENT DOCUMENTS

| | | | |
|---|---|---|---|
| 6,108,453 A * | 8/2000 | Acharya | 382/254 |
| 6,330,976 B1 | 12/2001 | Dymetman et al. | |
| 6,671,386 B1 | 12/2003 | Shimizu et al. | |
| 6,964,483 B2 | 11/2005 | Wang et al. | |
| 7,009,594 B2 | 3/2006 | Wang et al. | |
| 7,036,938 B2 | 5/2006 | Wang et al. | |
| 7,116,840 B2 | 10/2006 | Wang et al. | |
| 7,133,563 B2 | 11/2006 | Wang et al. | |
| 7,136,054 B2 | 11/2006 | Wang et al. | |
| 7,263,224 B2 | 8/2007 | Wang et al. | |
| 7,330,605 B2 | 2/2008 | Wang et al. | |
| 7,386,191 B2 | 6/2008 | Wang et al. | |
| 7,400,777 B2 | 7/2008 | Wang et al. | |
| 7,421,439 B2 | 9/2008 | Wang et al. | |
| 2002/0050982 A1 | 5/2002 | Ericson | |
| 2003/0030638 A1 | 2/2003 | Astrom et al. | |
| 2003/0189731 A1 * | 10/2003 | Chang | 358/3.28 |
| 2004/0086181 A1 * | 5/2004 | Wang et al. | 382/182 |
| 2005/0193292 A1 | 9/2005 | Lin et al. | |

(Continued)

OTHER PUBLICATIONS

Gonzalez, Rafael et al., "Digital Image Processing," 2002, Table of Contents and Preface, Second Edition, Prentice Hall, Upper Saddle Rive, New Jersey.

(Continued)

*Primary Examiner*—Amr Awad
*Assistant Examiner*—Liliana Cerullo
(74) *Attorney, Agent, or Firm*—Perkins Coie LLP

(57) ABSTRACT

A method and system for decoding data on a medium that is captured by an input device is described. The method decodes a symbol design, such as an embedded interaction code (EIC), on a display screen, such as a liquid crystal display (LCD). An image that is captured by an input device, such as a universal pen-type input device with a camera, is received. The captured image is processed to output an extracted bit stream. Position data and/or metadata information is decoded from the extracted bit stream and a position of the captured image with respect to a screen of the LCD is determined based upon the decoded position data. The EIC pattern may be recognized from LCD pixel grids and a bit stream of EIC bits may be extracted based upon the recognized EIC pattern.

13 Claims, 32 Drawing Sheets

U.S. PATENT DOCUMENTS

| | | |
|---|---|---|
| 2006/0109263 A1 | 5/2006 | Wang et al. |
| 2006/0123049 A1 | 6/2006 | Wang et al. |
| 2006/0182309 A1 | 8/2006 | Wang et al. |
| 2006/0182343 A1 | 8/2006 | Lin et al. |
| 2006/0190818 A1 | 8/2006 | Wang et al. |
| 2006/0204101 A1 | 9/2006 | Wang et al. |
| 2006/0242560 A1 | 10/2006 | Wang et al. |
| 2006/0242562 A1 | 10/2006 | Wang et al. |
| 2006/0242622 A1 | 10/2006 | Wang et al. |
| 2006/0274948 A1 | 12/2006 | Wang et al. |
| 2007/0001950 A1 | 1/2007 | Zhang et al. |
| 2007/0041654 A1 | 2/2007 | Wang et al. |
| 2007/0042165 A1 | 2/2007 | Wang et al. |
| 2008/0025612 A1 | 1/2008 | Wang et al. |

OTHER PUBLICATIONS

U.S. Appl. No. 10/849,249, Wang.
U.S. Appl. No. 11/066,800, Wang.
U.S. Appl. No. 11/067,193, Yang.
U.S. Appl. No. 11/089,189, Wang.
U.S. Appl. No. 11/142,844, Wang.
U.S. Appl. No. 12/131,810, Wang.
U.S. Appl. No. 12/138,339, Wang.
U.S. Appl. No. 12/180,484, Wang.

* cited by examiner

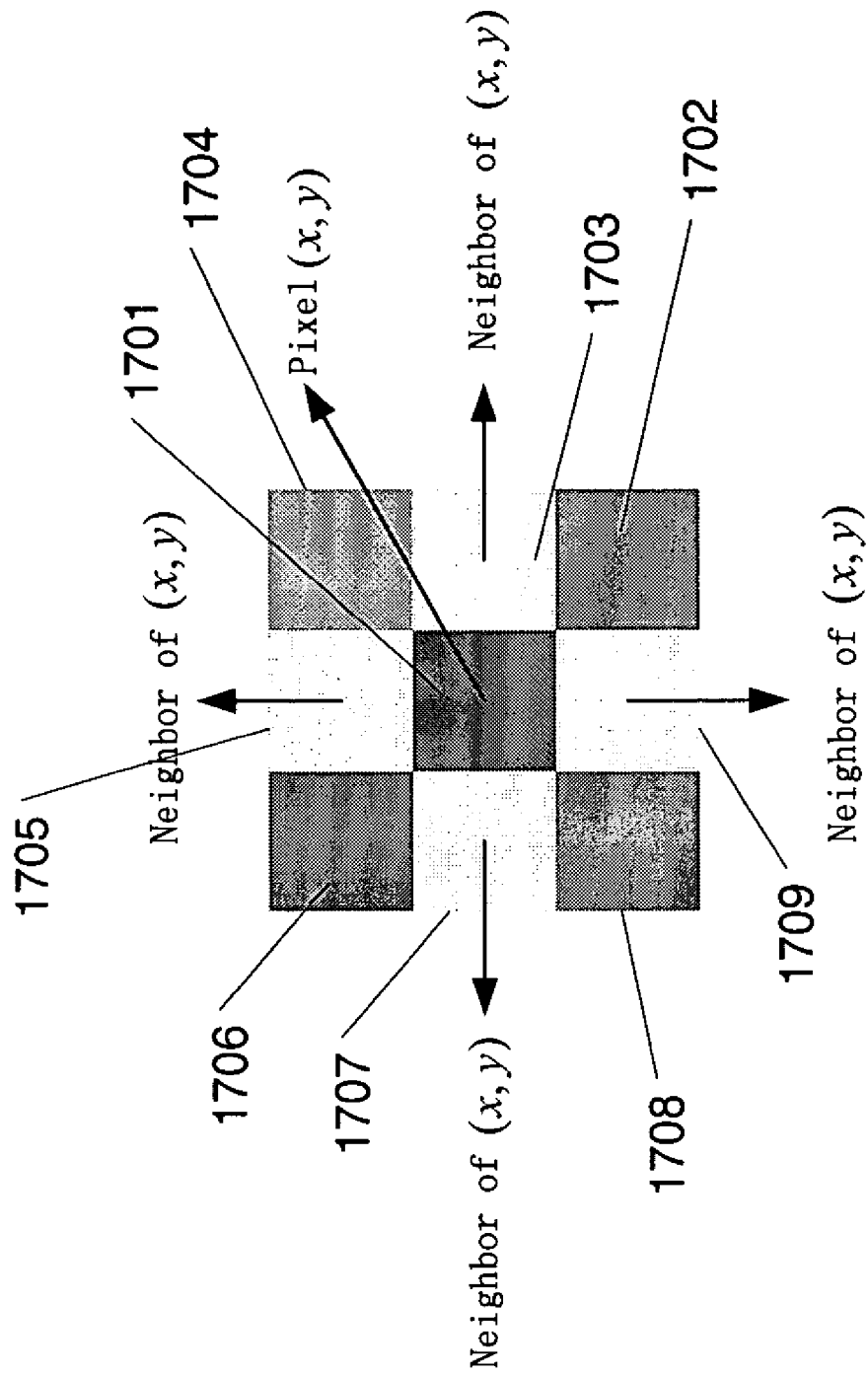

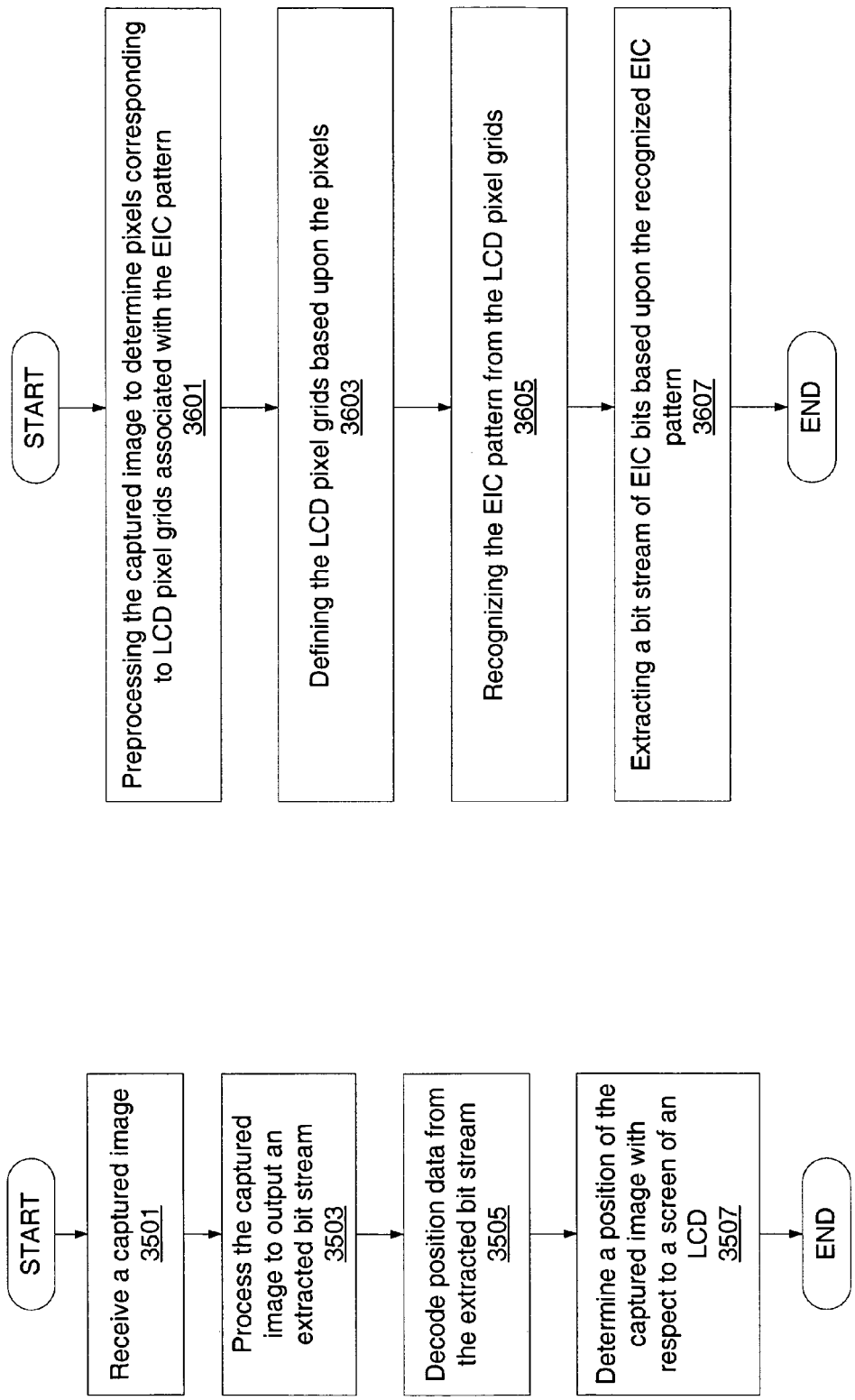

EMBEDDED INTERACTION CODE DECODING FOR A LIQUID CRYSTAL DISPLAY

BACKGROUND

The advent of the computer has boomed to a point of prolific use in a variety of different areas. Computers are used throughout the world for everything from controlling speed and direction in a vehicle, to making an online order for a new product, to allowing a young child to learn how to count or read. Within the business industry, the use of the computer has greatly increased the efficiency for performing tasks.

Computer users are accustomed to using a mouse and keyboard as a way of interacting with a personal computer. Despite the advances in technology, most computer users tend to use documents printed on paper as their primary editing tool. Some advantages of printed paper include its readability and portability. Others include the ability to share annotated paper documents and the ease at which one can archive printed paper. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult.

Computer technology has advanced in some areas in order to attempt to address these problems. With the advent of the tablet style personal computer, a computer user can input handwritten strokes onto the display regions of the monitor. As such, annotations may be entered directly into a document. However, many problems exist with respect to tracking the movement of an input device for the handwritten annotations.

One technique of capturing handwritten information is by using a pen whose location may be determined during writing. One type of pen functions by using a camera to capture an image of paper encoded with a predefined pattern. This pattern is used by the pen to determine a location of a pen on a piece of paper. However, the pattern is encoded onto a paper document. A user must still maintain a paper document for use with the pen to be uploaded to a personal computer.

SUMMARY

Aspects of the present invention are directed generally to decoding data on a medium that is captured by an input device. More particularly, aspects of the present invention are directed to a method and system for decoding a symbol design, such as an embedded interaction code (EIC), on a display screen, such as a liquid crystal display (LCD). An image that is captured by an input device, such as a universal pen-type input device with a camera, is received. The captured image is initially processed to output an extracted bit stream. Position data and/or metadata information is then decoded from the extracted bit stream and a position of the captured image with respect to a screen of the LCD is determined based upon the decoded position data.

Another aspect of the present invention provides for pixels corresponding to LCD pixel grids associated with the EIC pattern to be determined and the LCD grids to be defined based upon the pixels. The EIC pattern is then recognized from the LCD pixel grids and a bit stream of EIC bits are extracted based upon the recognized EIC pattern.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 6 illustrates another example of a symbol of 3×3 LCD pixels, where each sub-pixel may be embedded with 2 bits in accordance with at least one aspect of the present invention;

FIG. 7 illustrates another example of a symbol of 4×5 LCD pixels, where each sub-pixel may be embedded with 3 bits in accordance with at least one aspect of the present invention;

FIG. 8 illustrates another examples of a symbol of 4×4 LCD pixels, where the black matrix may be embedded with positioning data bits in accordance with at least one aspect of the present invention;

FIG. 17 illustrates an example block diagram for defining pixels that neighbor a pixel (x,y) in accordance with at least one aspect of the present invention;

FIGS. 35-37 are flowcharts of illustrative methods for decoding an EIC pattern on an LCD in accordance with at least one aspect of the present invention.

DETAILED DESCRIPTION OF ILLUSTRATIVE EMBODIMENTS

Figure 1A:
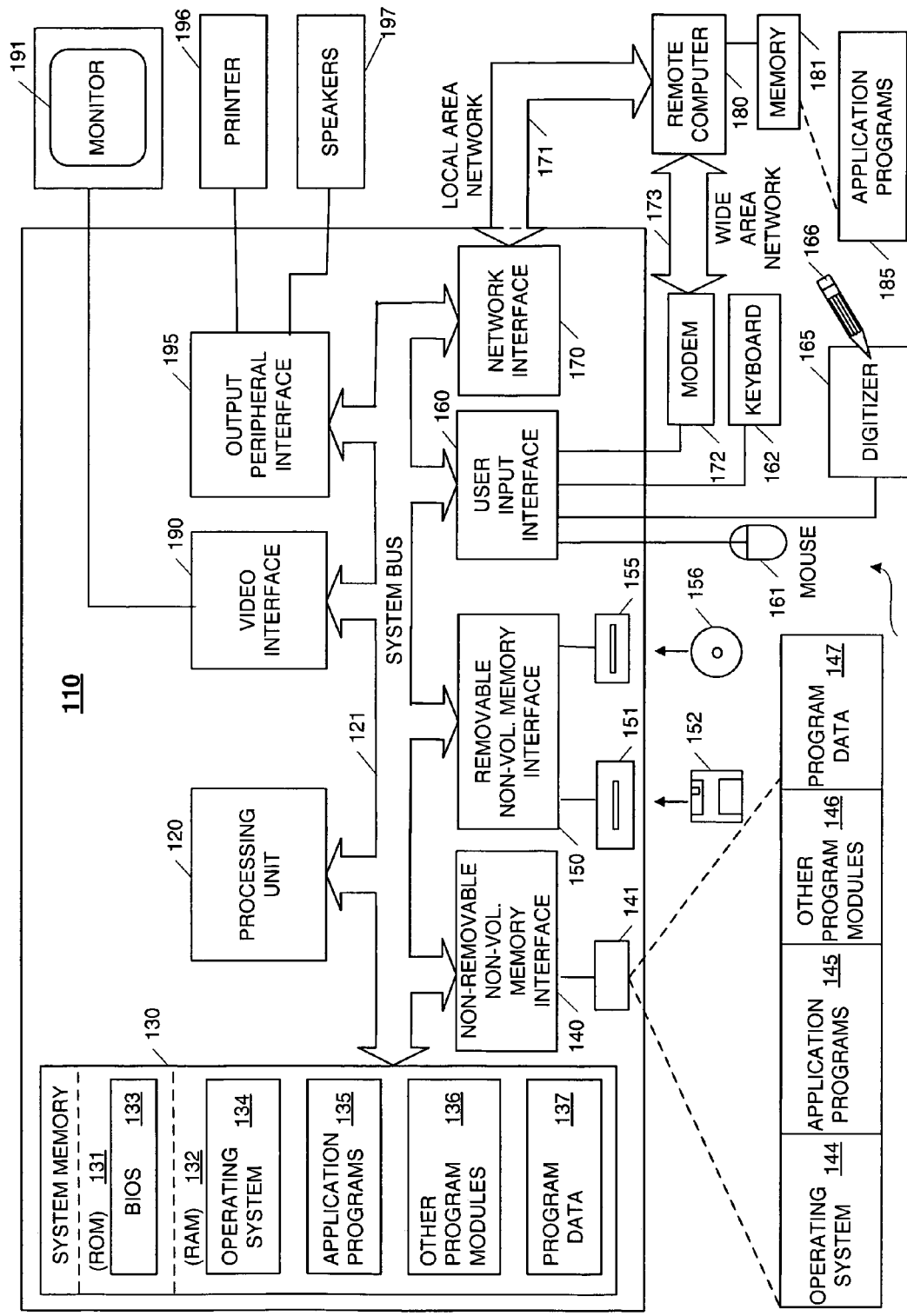
FIG. 1A illustrates a schematic diagram of a general-purpose digital computing environment in which certain aspects of the present invention may be implemented.

In the following description of various illustrative embodiments, reference is made to the accompanying drawings, which form a part hereof, and in which are shown, by way of illustration, various embodiments in which the invention may be practiced. It is to be understood that other embodiments may be utilized and structural and functional modifications may be made without departing from the scope of the present invention.

Terms

| | |
|---|---|
| Pen | Any writing implement that may or may not include the ability to store ink. In some examples, a stylus with no ink capability may be used as a pen in accordance with embodiments of the present invention. |
| Camera | An image capture system that may capture an image from paper, a computer display, or any other medium. |
| EIC Symbol Array | The EIC symbol array is formed by EIC symbols in place of the bits of the m-array representing X-Y position and metadata. Represents the physical space covered by the m-array representing X-Y position and metadata. EIC symbol array can be allocated to pages of a document. |
| Stroke | An action made by the pen on a document or surface contain the EIC symbol array, where the array is captured by the camera during the performance of the action. |
| Grid | The grid is a set of lines formed by EIC dots in EIC symbol array. |

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera (not shown), a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A digitizer 165 and accompanying pen or stylus 166 are provided in order to digitally capture freehand input. Although a direct connection between the pen digitizer 165 and the user input interface 160 is shown, in practice, the digitizer 165 may be coupled to the processing unit 120 directly, via a parallel port or other interface and the system bus 121 as known in the art. Furthermore, although the digitizer 165 is shown apart from the monitor 191, the usable input area of the digitizer 165 may be co-extensive with the display area of the monitor 191. Further still, the digitizer 165 may be integrated in the monitor 191, or may exist as a separate device overlaying or otherwise appended to the monitor 191.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
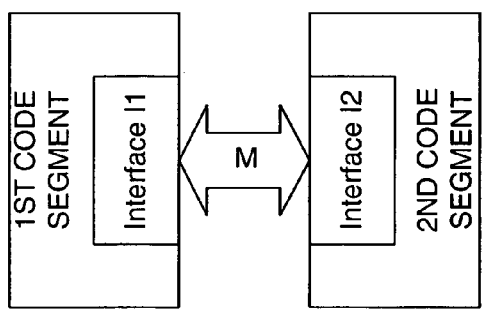
FIGS. 1B through 1M show a general-purpose computer environment supporting one or more aspects of the present invention.
Figure 1E:
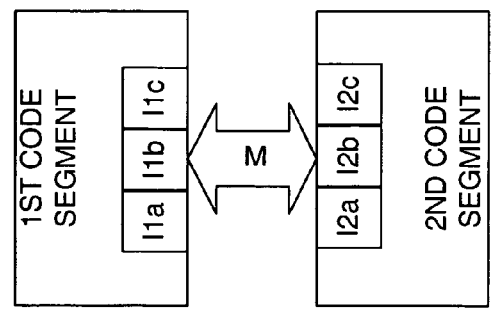
Figure 1B:
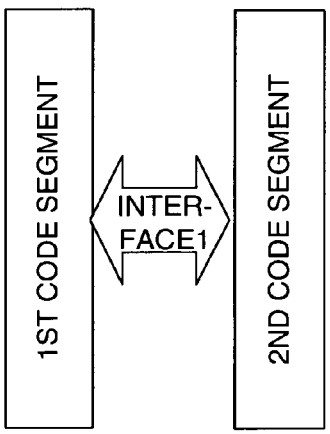

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
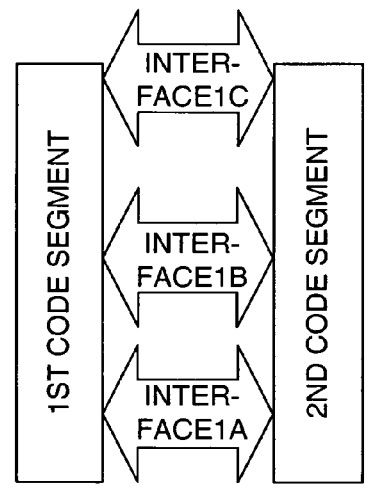

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
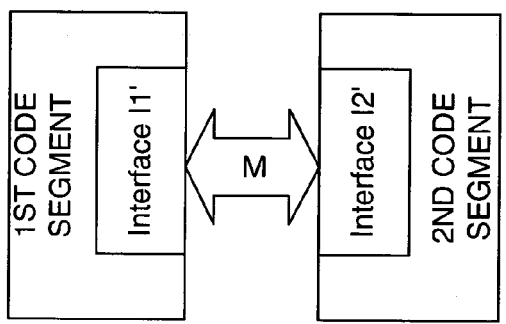
Figure 1G:
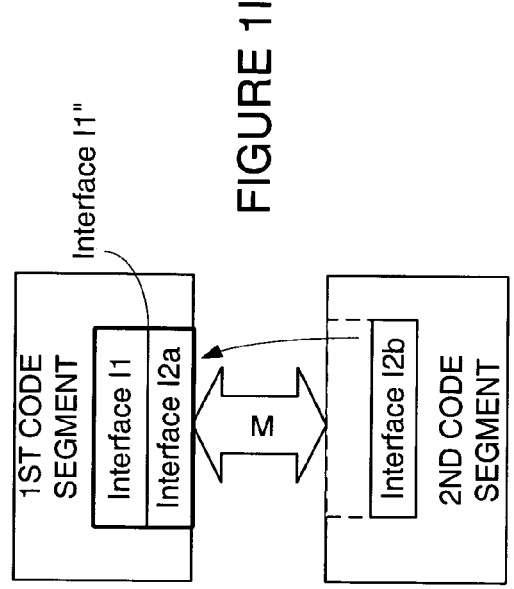

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
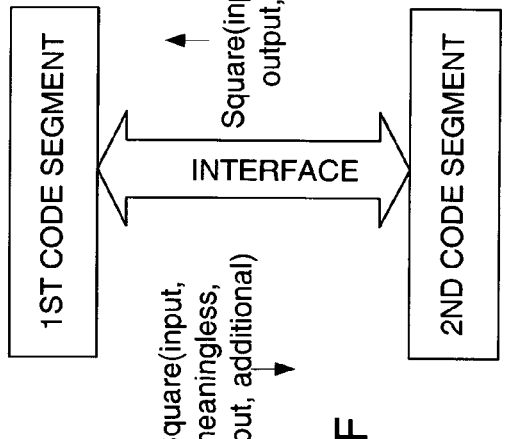
Figure 1I:
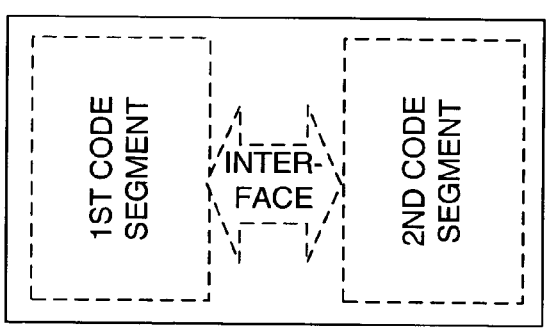

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
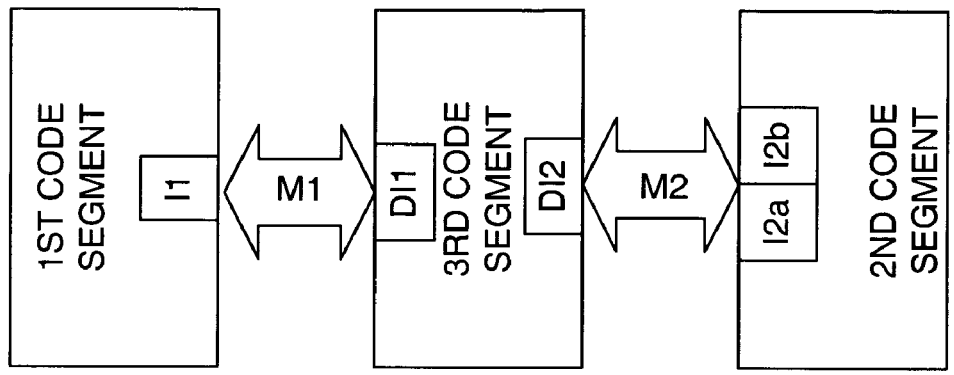
Figure 1J:
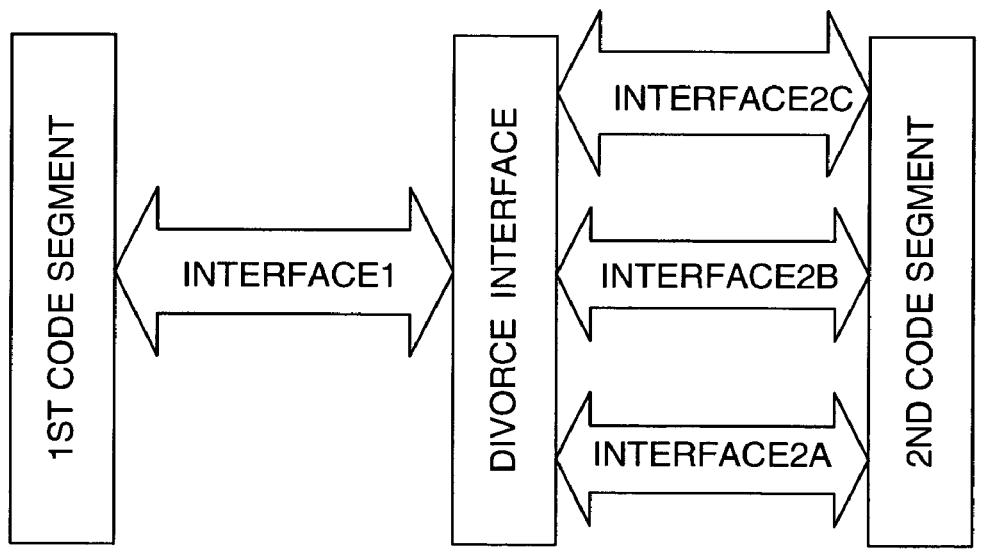

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
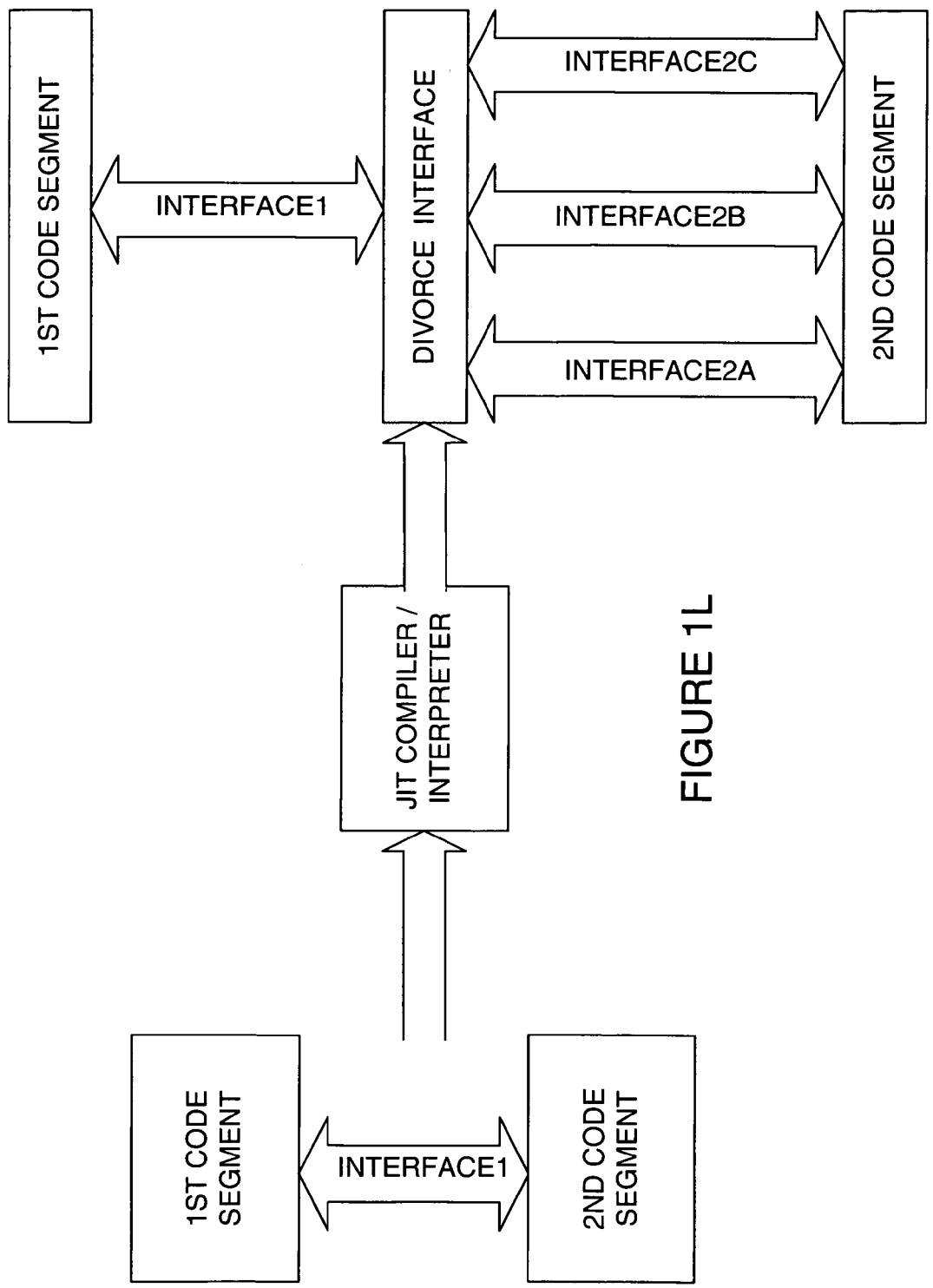
Figure 1M:
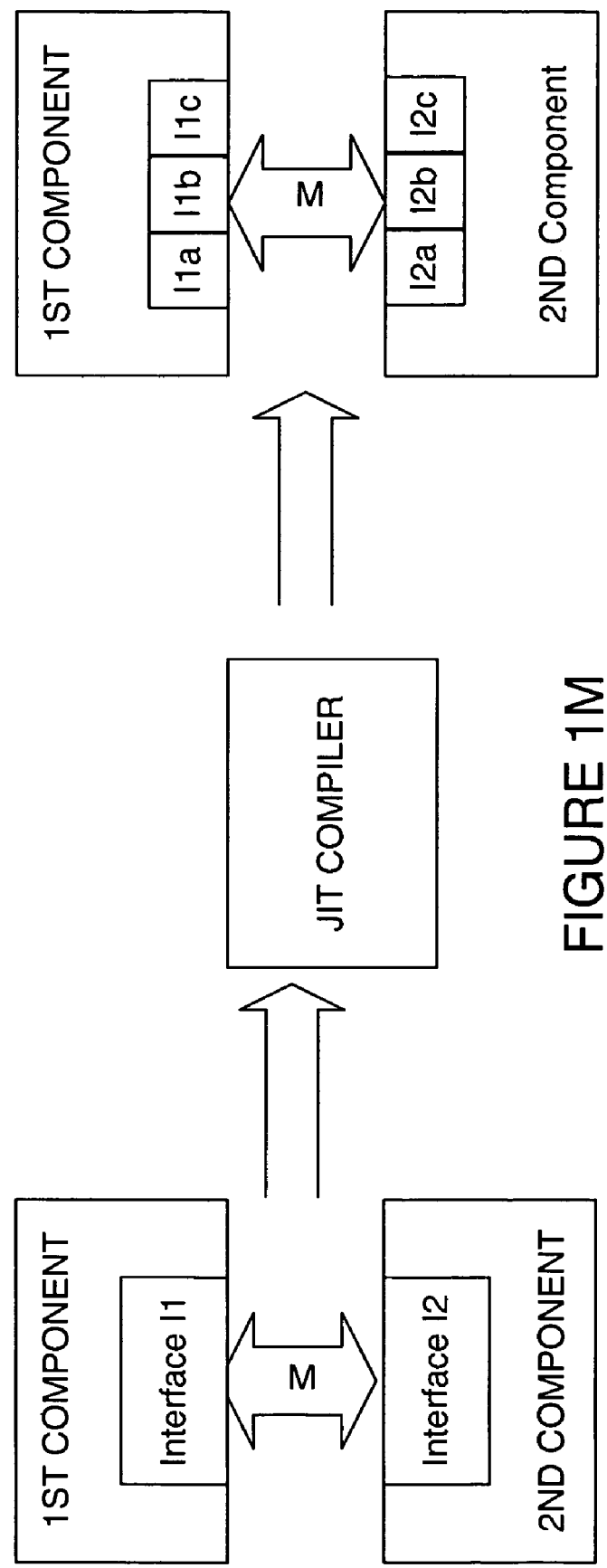

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Aspects of the present invention include placing an encoded data pattern in a liquid crystal display (LCD) form. For example, the encoded data stream may be represented as an encoded image overlying the displayed image or may be a physical encoded image on a display screen (so any image portion captured by a pen is locatable on the display screen). In accordance with one aspect of the invention, the design pattern hides position information ad/or metadata information. The pattern is displayed on an LCD screen, so when a camera samples pictures from the LCD screen, the camera or computing device associated with the camera may determine its position on the LCD screen accordingly and/or any metadata stored within the pattern. Aspects of the present invention provide an embedded interaction code (EIC) pattern that is embedded into sub pixels of an LCD, showing up temporally.

Figure 2:
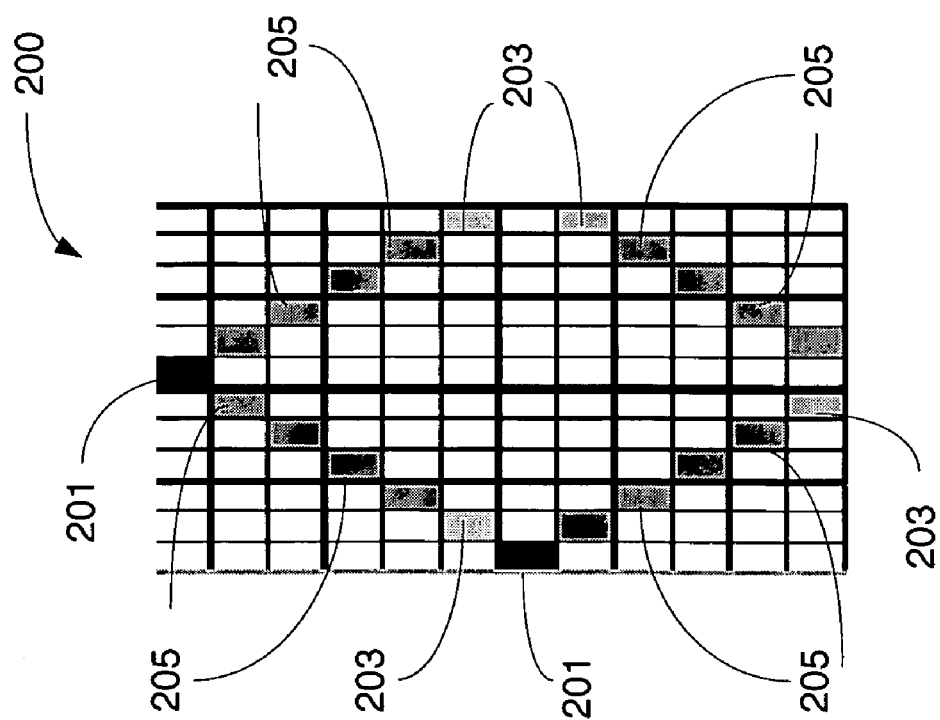
FIG. 2 illustrates an example of an embedded interaction code (EIC) symbol composed of liquid crystal display (LCD) sub-pixels in accordance with at least one aspect of the present invention.

An embedded interaction code (EIC) symbol is the smallest unit of visual representation of an EIC array, which is a single or multiple binary array that are used to represent x-y position and metadata. An EIC symbol includes: one or more bits encoded in one symbol, visual representation of the bits, and physical size of the one symbol. For LCD embodiments, the EIC pattern design may be represented by LCD pixels or sub-pixels. FIG. 2 is a sketch figure of an EIC symbol 200 composed of LCD sub-pixels, which represents the design of an EF-diamond-8 bit-a-16. FIG. 2 illustrates a symbol of 12×4 LCD pixels, where each sub-pixel may be embedded with 8 bits. An EF-diamond-8 bit-a-16 was originally designed for operation on printed documents. In accordance with at least one aspect of the present invention, such a symbol may also operate on LCD screen. As shown, dots 201 may be dots which are shown as clock dots, dots 203 may be dot positions which are left blank to help detect orientation of the EIC pattern, and dots 205 may be dot positions which are used to embed a bit for x-y position and metadata.

Although utilizing an EIC pattern on paper is known and used, there are issues when one attempts to directly use an EIC pattern for paper on an LCD. Some of these issues include the symbol size, the visual effect, and the algorithm complexity. As such, an EIC symbol for an LCD are redesigned and optimized in accordance with features of an LCD.

An LCD screen utilizes the open and shutter operation of liquid crystal cells arranged uniformly in the screen to show images. The operation of the lighting and non-lighting of pixels and sub-pixels are well known by those skilled in the art. Behind the crystal cells are many lamps that are lit when the displayer is electrified. If all the liquid crystal cells are open, back light comes into an individual's eyes fully, so the screen is white. When displaying, each pixel's state of being open or close may be determined through the analog to digital conversion of the display signals, so the picture may be shown by controlling the state of each LCD pixel. Because the lighting rate of the back lamp in an LCD is higher than the refresh rate of a cathode ray tube (CRT) device, the pictures on an LCD are very steady. A displayer emits three kinds of light, namely red, green, and blue.

Figure 3:
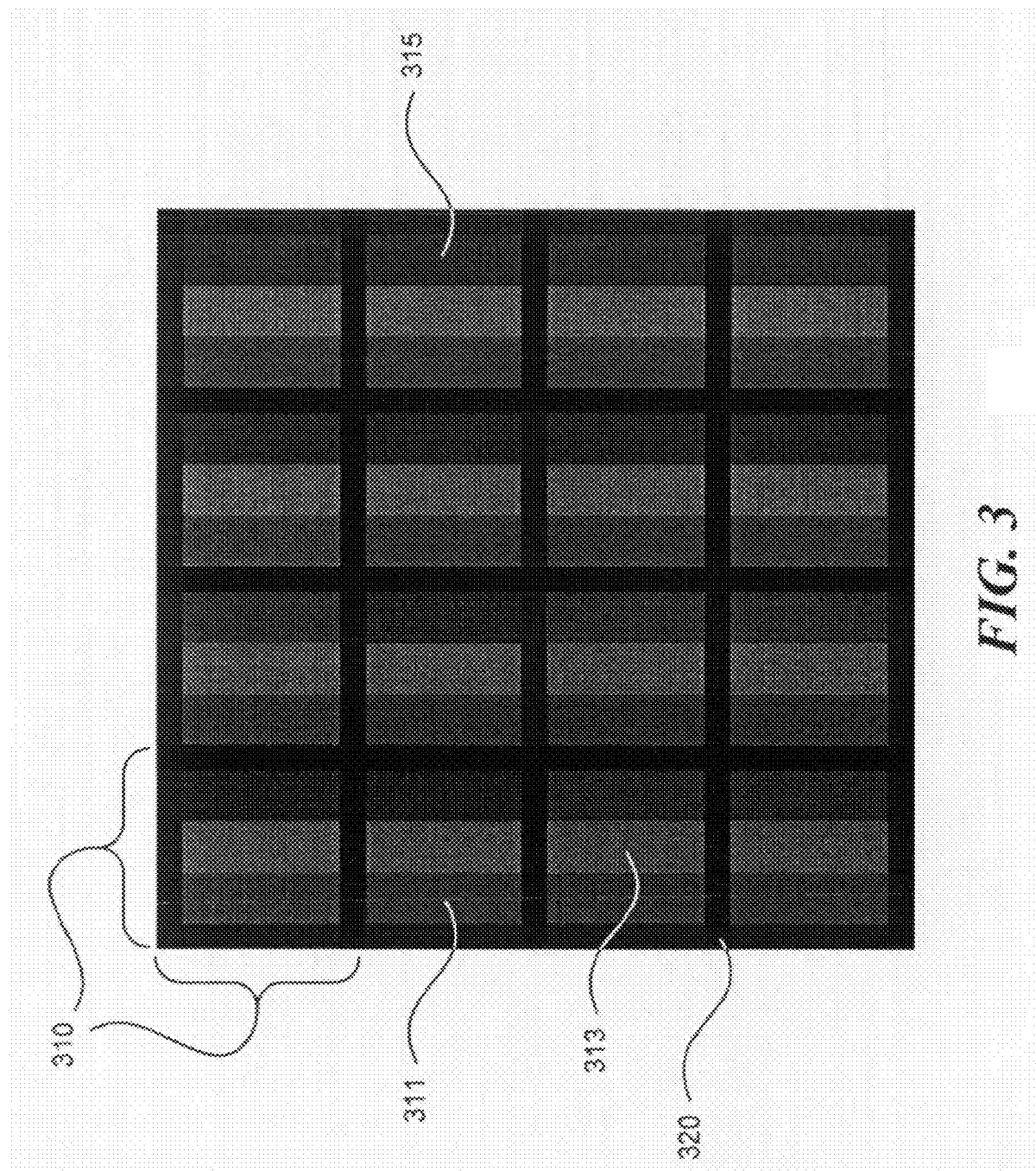
FIG. 3 illustrates an example of liquid crystal cells and sub-pixels arranged in an LCD.

The liquid crystal cells and sub-pixels arranged in the LCD are formed as shown in FIG. 3. An LCD pixel 300 may be composed of an arrangement of 4×4 sub-pixels 310. One sub-pixel 310 is shown by a dashed line. Within a sub-pixel 310, the red 311, green 313, and/or blue 315 channels may be used to embed code, which decreases the stimulus to eyes in spatial distribution as compared to the application of an EIC pattern onto a paper surface. The LCD grid 320 may be used to detect the grid information. A black dot used as clock dot in an EIC pattern on a paper surface may be neglected for application on an LCD screen. Sparser distribution of coded dots also contributes to a decreased affect on a user during normal reading of an LCD screen as described below.

For an LCD screen, an EIC pattern may be configured and displayed with the detection functionalities of a standard EIC paper based design pattern while being less sensitive to the human eye. Aspects of the present invention describe an EIC symbol pattern to embed into an EIC array. Features of LCD technology may be used to decrease the algorithm complexity and affect on the human eye.

Figure 4B:
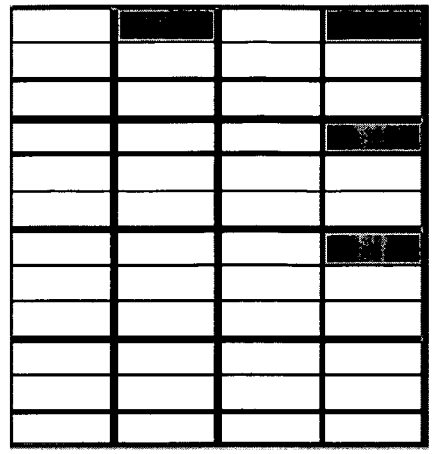
FIGS. 4A and 4B illustrate examples of a symbol of 4×4 LCD pixels, where each sub-pixel may be embedded with 2 bits in accordance with at least one aspect of the present invention.
Figure 5:
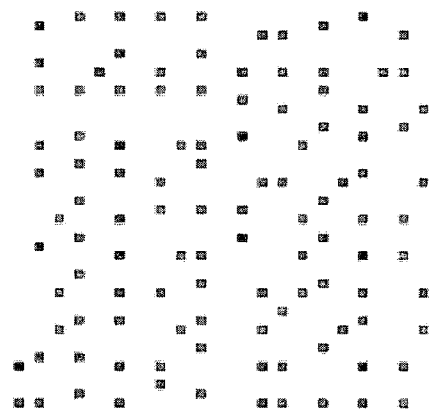
FIG. 5 illustrates an example EIC pattern tiled with the 4×4 symbol of FIG. 4A when magnified in accordance with at least one aspect of the present invention.
Figure 4A:
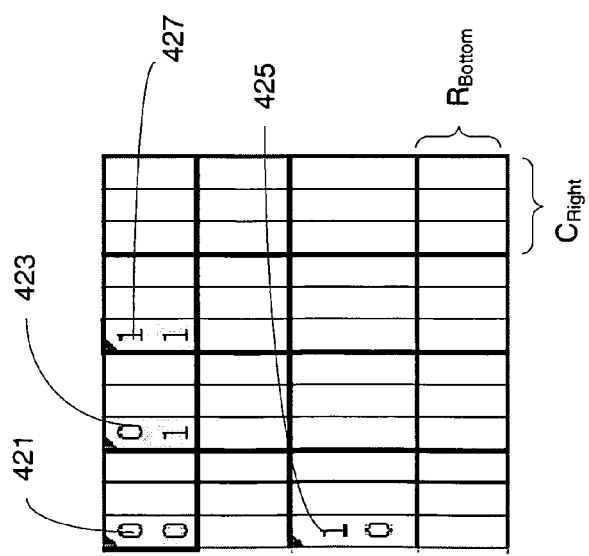

FIG. 4A illustrates a symbol of 4×4 LCD pixels, where each sub-pixel may be embedded with 2 bits. FIG. 5 is an illustrative EIC pattern tiled with the 4×4 symbol when magnified 800%. Normally in computer graphics, the intensity formula I=0.59*R+0.3*G+0.11*B is used. The red channel (R) influences intensity more than the green channel (G) or the blue channel (B), and is more sensitive to a camera. Moreover, the color red is more sensitive to the human eye compared to the color green or the color blue. As such, implementations of the present invention are illustrated with the red channel (R) being used to embed code; however, it should be understood by those skilled in the art that the green channel, (G), blue channel (B), or combinations of the red channel, green channel and/or blue channel may be used and that the present invention is not so limited to the illustrations provided herein.

In one embodiment, when embedding code at a red channel (R) sub-pixel position, the gray value of red channel (R) equals zero and the grey value of green channel (G) and blue channel (B) equals 255 respectively. The red channel (R) sub-pixel is dark with no light irradiating, whereas, the green channel (G) and blue channel (B) sub-pixels are fully open, and are shown as white. In accordance with another embodiment, the grey value of each of the red channel (R), green channel (G), and blue channel (B) may be changed based upon a color of an underlying image displayed on the LCD. Moreover, as shown in FIG. 4A, in order to make the codes sparser, there is no black dot in the symbol design, and only one dot is shown of four possible positions, 421, 423, 425, and 427, in each symbol. For example, if the code is 00, then a dot is displayed at red channel (0,0) sub-pixel position 421. If the code is 01, then a dot is displayed at red channel (0,1) sub-pixel position 423.

In addition, in each configuration, such as the 4×4 configuration shown in FIG. 4A, the right-most column $C_{Right}$ and bottom-most row $R_{Botton}$ may remain blank. Such a design with the right most column and bottom most row remaining blank ensures that two embedded codes are not connected, potentially causing an error when attempting to read information. The configuration to leave a column blank and a row blank of code may be different, such as shown in FIG. 4B where the left most column remains blank and the top most row remains blank of possible code positions. It should be understood by those skilled in the art that other configurations may be implemented in accordance with aspects of the present invention, including the use of all row and/or columns for positioning of code data.

Figures 6, 7, 8:
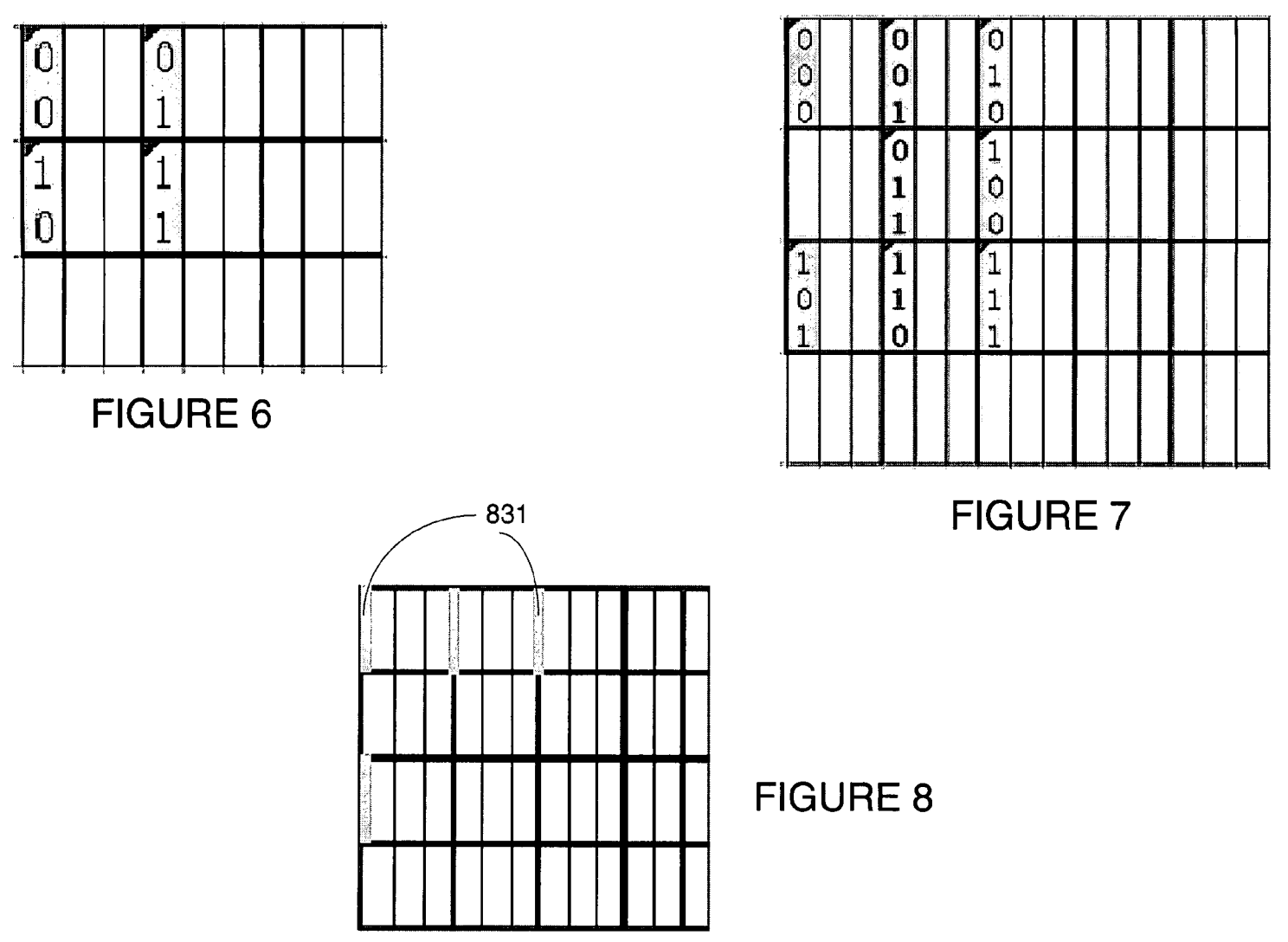

FIGS. 6 and 7 illustrate other symbols of LCD pixels. FIG. 6 illustrates a symbol of 3×3 LCD pixels, where each sub-pixel may be embedded with two (2) bits. FIG. 7 illustrates a symbol of 4×5 LCD pixels, where each sub-pixel may be embedded with three (3) bits. Although these are but some examples, it should be understood that one or more aspects of the present invention may be implemented within other configurations. For example, the size of the EIC pattern may be defined by a certain number of columns 1 to M and a certain number of rows 1 to N. FIG. 6 illustrates an example of three columns and three rows, while FIG. 7 illustrates an example of 5 columns and 4 rows.

Because the code is embedded into a sub-pixel, e.g., the red channel as shown in the illustrated Figures, the orientation of the EIC pattern is known if the LCD grid is known. In implementation, the grid of an LCD may be captured by a camera as shown in FIG. 9A. Because the left side of an LCD pixel value is dark and the right side is white, determination of the orientation of the pattern may be done. If the orientation of the pattern has been determined, then the black dots may be decoded in the symbol. Consequently, the position information and/or metadata information may be decoded as is done in paper-type EIC pattern applications.

In accordance with another aspect of the present invention, an EIC symbol pattern may also be embedded into other areas for the sub-pixels. For example, as shown in FIG. 8, an EIC symbol pattern may also be embedded into a black matrix, e.g., the LCD grid. As shown in FIG. 8, as opposed to positioning code within a color channel sub-pixel, such as the red channel (R) position in a sub-pixel, an edge 831 of a sub-pixel may be darkened. The code may be configured to include some of the region of the sub-pixel designated for a particular color channel.

With respect to actually embedding an EIC pattern on an LCD screen, one point may be to decrease the appearance of the pattern in temporal and spatial distribution, so as to decrease the stimulus to the human eye. In accordance with one implementation, an overlay technology, such as Microsoft® DirectX, by Microsoft® Corporation of Redmond, Wash., may be used to show the EIC pattern, periodically switching to the LCD screen surface. In such an implementation, the pattern is flashing. The interchanging frequency depends on the refresh time of the particular LCD. For example, if the refresh time of an LCD screen is 12 ms, and the ratio to show the pattern versus screen content is set to 1:1, then the EIC pattern presentation frequency is approximately 40 Hz.

Figure 9B:
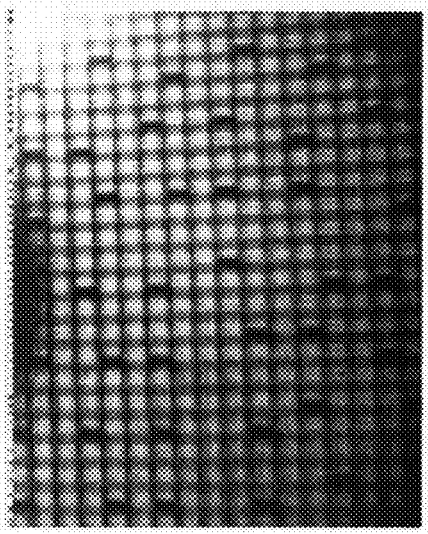
FIGS. 9A-9C illustrate example EIC pattern images captured by a camera in accordance with at least one aspect of the present invention.
Figure 9C:
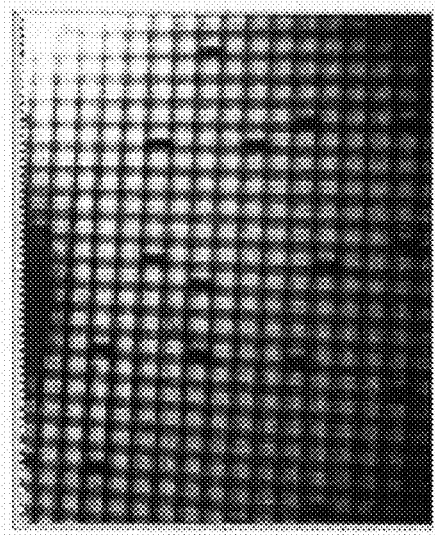
Figure 9A:
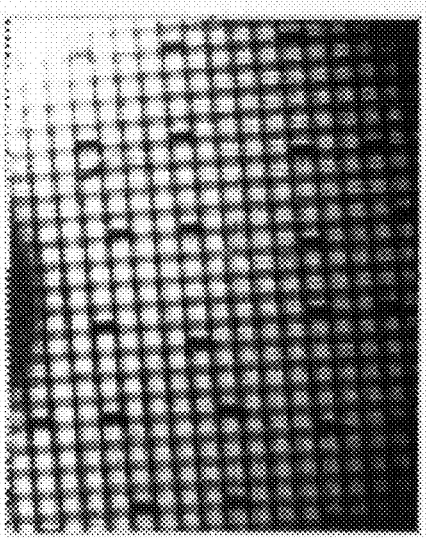

FIGS. 9A-9C illustrate three EIC pattern images captured by a camera. FIG. 9A illustrates a captured EIC pattern image of symbols of 4×4 LCD pixels, where each sub-pixel may be embedded with 2 bits. Such a captured EIC pattern correlates to the EIC pattern symbol as shown in FIG. 4A. FIG. 9B illustrates a captured EIC pattern image of symbols of 3×3 LCD pixels, where each sub-pixel may be embedded with 2 bits. Such a captured EIC pattern correlates to the EIC pattern symbol as shown in FIG. 6. FIG. 9C illustrates a captured EIC pattern image of symbols of 4×5 LCD pixels, where each sub-pixel may be embedded with 3 bits. Such a captured EIC pattern correlates to the EIC pattern symbol as shown in FIG. 7. Image processing and decoding for aspects of the present invention are described more fully in detail below.

In accordance with another implementation of aspects of the present invention, an image on an LCD screen may be watermarked with an EIC pattern. In such an implementation, the EIC pattern may not flash. Instead, the EIC pattern is updated when content refresh is refreshed on the LCD screen. The process of watermarking may be performed in a memory of the LCD with graphics processing units (GPU) or by other means and methods.

Figure 10B:
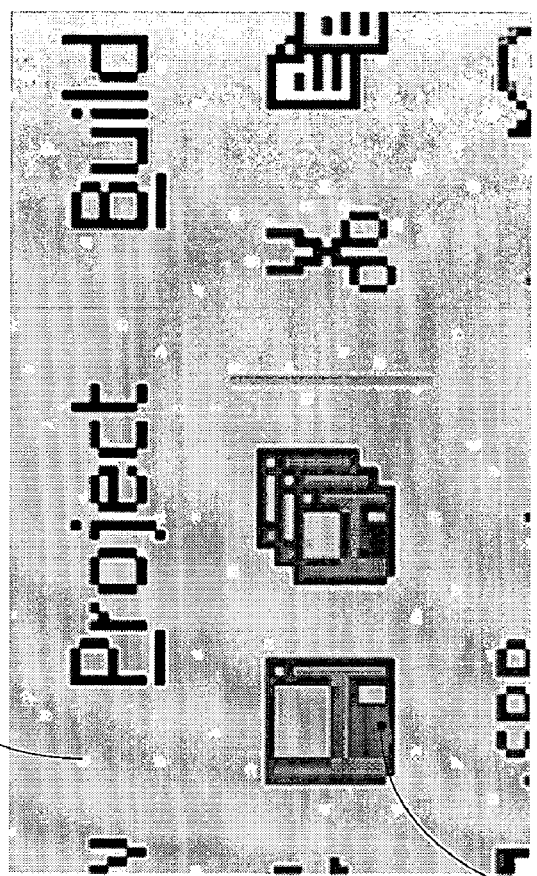
FIGS. 10A and 10B illustrate a portion of an LCD screen with an EIC pattern watermarked on the screen in accordance with at least one aspect of the present invention.
Figure 10A:
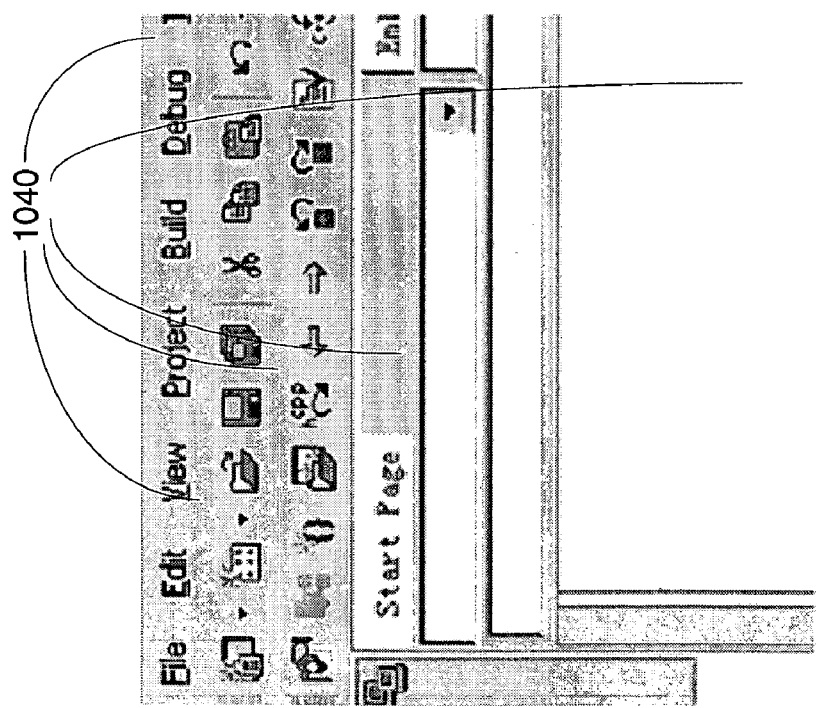

As shown in FIGS. 10A and 10B, a portion of an LCD screen is shown with an EIC pattern watermarked on the screen image. The grey value of the sub-pixels used to embed code may be changed in accordance with the background color of the underlying image displayed on the LCD. For example, FIG. 10A illustrates a portion in which sub-pixels 1040 are shown with EIC code embedded therein. FIG. 10B illustrates the portion in a magnified form to illustrate how one sub-pixel 1041 with an embedded EIC code has a different grey value from another sub-pixel 1043 with an embedded EIC code. In the example shown, the grey value of sub-pixels used to embed the code is changed in accordance with the background color of the screen image displayed on the LCD. As such, if a user changes a general location of an image on the LCD display screen, the sub-pixel of that portion of the LCD screen for display of an image and embedded EIC code is changed as well in accordance with the background color of the underlying image. Methods and systems for changing the color may include alpha-blending with a standard implemented color for the EIC code on a white background, varying the grey of the sub-pixel by a certain percentage with respect to the background image grey value, or other methods and systems.

Figure 11:
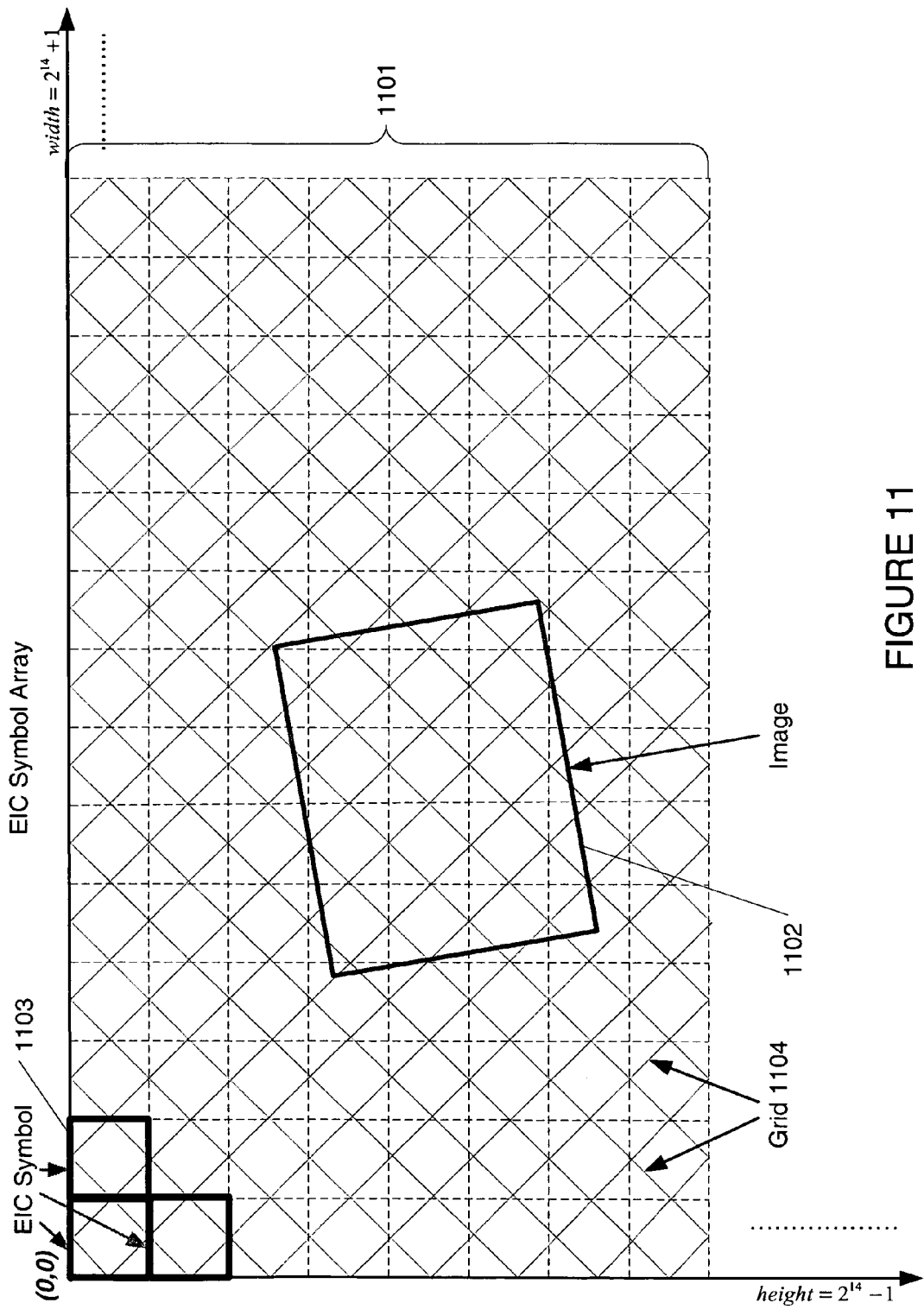
FIG. 11 illustrates an example array of embedded interaction codes in accordance with at least one aspect of the present invention.

FIG. 11 shows an array 1101 of EIC elements arranged into symbols 1103 that have the EIC elements located on gridlines 1104. An image 1102 is captured by a camera. The EIC symbols 1103 and images of EIC dots can be analyzed to find the corresponding grid lines 1104 in image 1102. If the grid lines 1104 in the image 1102 are found, the corresponding EIC symbols 1103 can be identified and the image 1102 located within array 1101. Here, array 1101 is shown with a height of $2^{14}-1$ and a width of $2^{14}+1$. The size of the array can vary, of course, as well as the resulting information provided in each EIC symbol 1103 (where the smaller the array, the less information needed in EIC symbols to locate the image 1102 in the array 1101).

An m-array may be used to represent the X, Y position in an array and multiple m-arrays may be used to represent metadata. These multiple m-arrays may be encoded in EIC symbols. In each EIC symbol, one bit from each m-array may be encoded. EIC symbols in place of the bits of the m-array representing X, Y position and/or metadata information form an EIC symbol array (visually, the tiling of EIC symbols forms the EIC pattern). FIG. 11 shows an EIC symbol array 1101 (of EIC symbol 8-a-16, in an m-array with the order of 28).

EIC pattern analysis includes two main steps. First, images may be processed to improve contrast or undergo other pre-processing. Next, features of an EIC pattern in the image are analyzed. A pen-type input device may be used to analyze the image. The input device is assumed to capture images from a plane. The spatial transform converts the plane to a resulting image (which is also assumed to be a plane). This transformation may be a perspective transform. Here, an EIC pattern in image is expected to lie on grid lines 1104 that are a perspective transform of the grid lines in the EIC symbol array. The perspective transform is first assumed to be an affine transform (i.e. evenly spaced parallel lines are kept evenly spaced and parallel, but perpendicular lines may not be perpendicular anymore). Rotation, scale and translation of the affine transform are estimated from analyzing the EIC pattern in image. The perspective transform can then be obtained by fitting an effective EIC pattern to the affine transformed grid lines.

Figure 12:
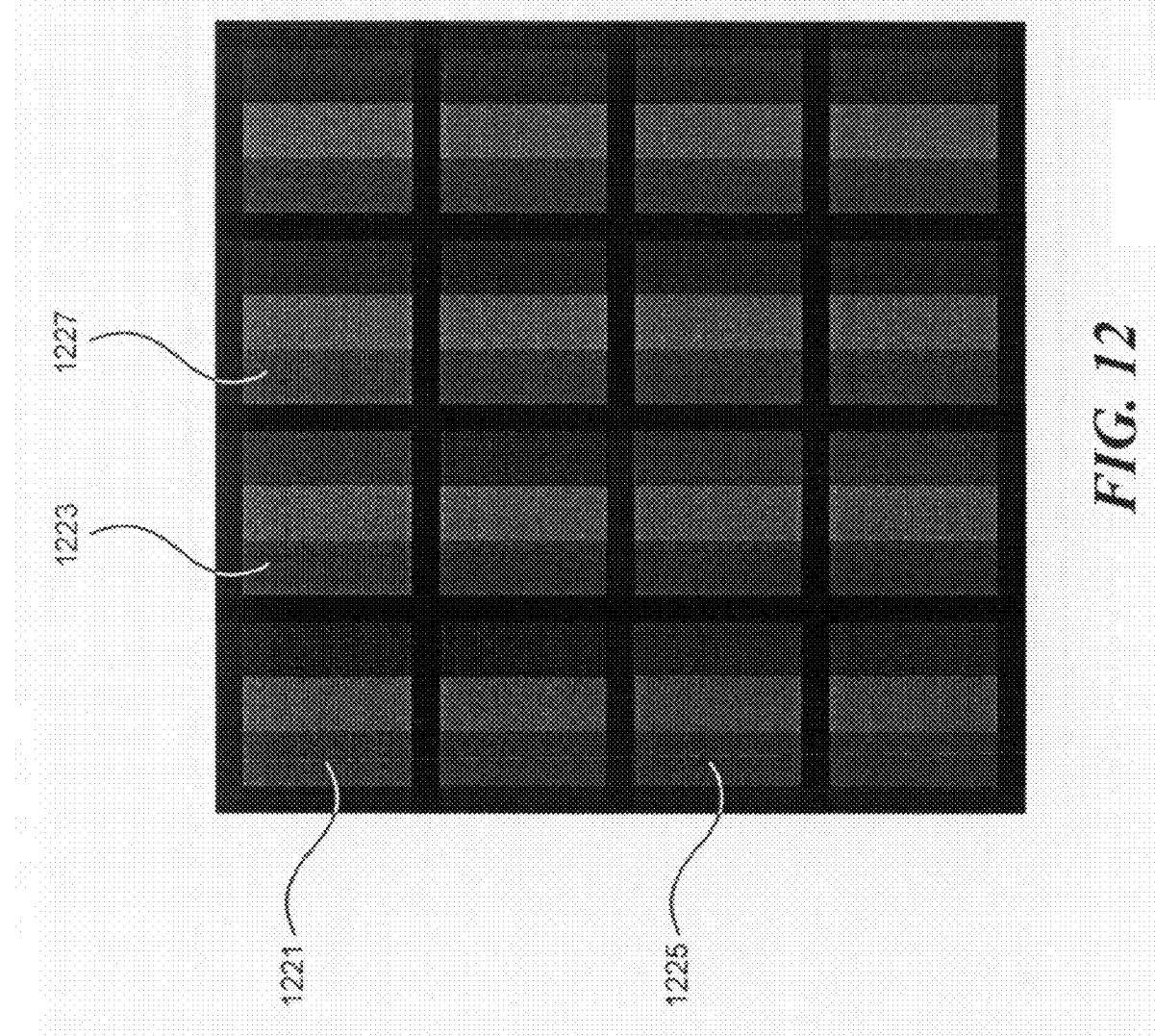
FIG. 12 illustrates example liquid crystal cells and sub-pixels arranged in an LCD, with four possible positions, in the red channel (R) of a sub-pixel for embedding an EIC pattern in accordance with at least one aspect of the present invention.

As described above, an x-y position and metadata information may be embedded on an LCD screen and a pen-type device with a camera assembly may track the position by reading the embedded data. In accordance with further aspects of the present invention, position data and metadata information may be decoded from the images captured by a camera, such as a pen-type input device with a camera, when the camera moves over an LCD screen. As such, the position data and metadata information in an EIC pattern in an image may be decoded by a camera and/or a computer associated with a camera that captures the EIC pattern. The algorithms described herein illustrate methods and systems for decoding 4×4 LCD pixels, where each sub-pixel may be embedded with 2 bits. FIG. 12 illustrates liquid crystal cells and sub-pixels arranged in an LCD, with four possible positions, 1221, 1223, 1225, and 1227 in the red channel (R) of a sub-pixel for embedding an EIC pattern.

In accordance with aspects of the present invention, there are two steps for decoding x-y position data and/or metadata information from captured images. The first step is vision processing of a captured image, where the input is the captured image and the output is an extracted bit stream. The second step is decoding the x-y position data and/or metadata from the extracted bit stream.

Figure 13:
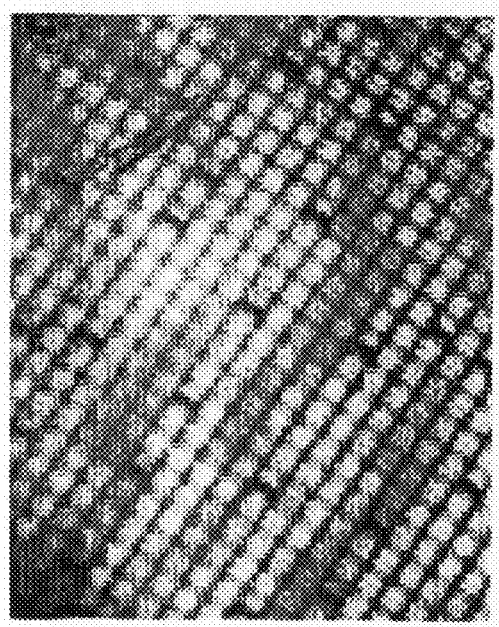
FIG. 13. illustrates an example of a captured image by a camera in accordance with at least one aspect of the present invention.

FIG. 13 illustrates a sample of a captured image. Certain aspects of the present invention with respect to decoding data from a captured image will utilize the image captured in FIG. 13. In accordance with these aspects of the present invention, the vision processing of a captured image may contain three steps. The steps are pre-processing, LCD-pixel grid analysis, and EIC symbol recognition.

One aspect of the step of pre-processing is to obtain effective pixels that form the LCD grids, i.e., the LCD grid mask. All pixels on the LCD grids are not needed for further data processing, just the pixels near the grid vertex for the algorithm within the next step to determine the perspective transform of the LCD grids from the LCD screen plane to the sensor plane.

Figure 14:
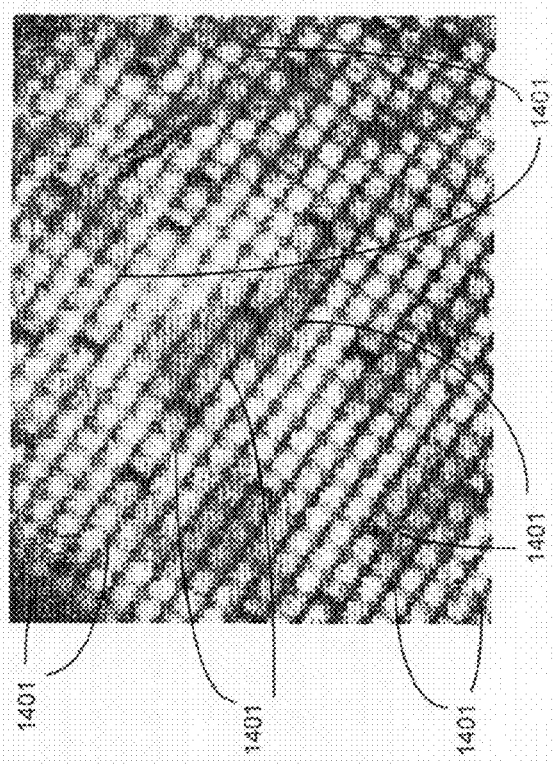
FIG. 14 illustrates an example of a normalized image of FIG. 13 with an effective LCD grid mask in accordance with at least one aspect of the present invention.

As described above, the input of the pre-processing step is a captured image, such as the image shown in FIG. 13. The output is an effective LCD grid mask. FIG. 14 illustrates a normalized image of FIG. 13 with an effective LCD grid mask indicated by the white dotted pixels 1401.

Figure 15:
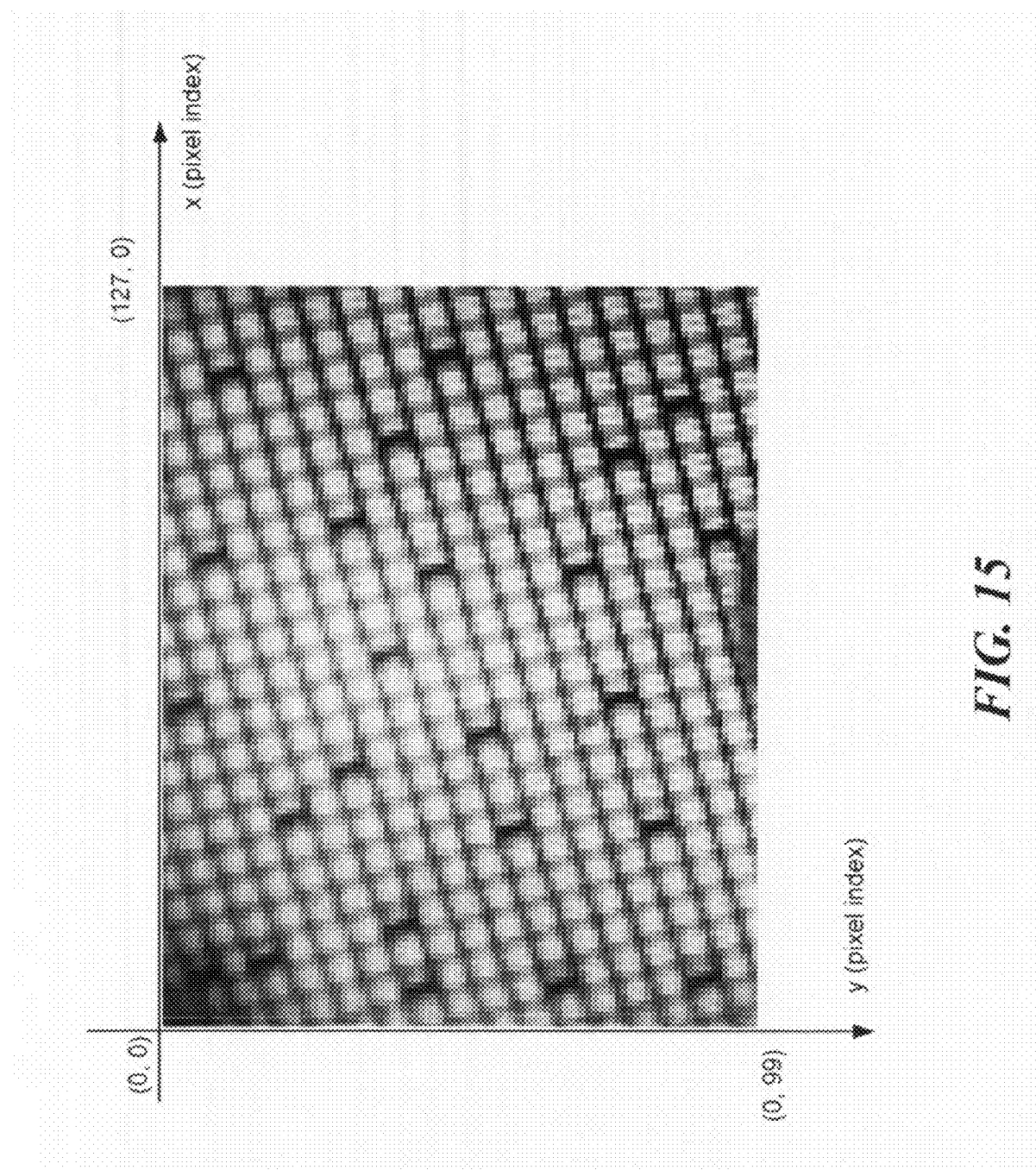
FIG. 15 illustrates an example pixel index for determining orientation and position data in accordance with at least one aspect of the present invention.

In the descriptions below, an image sensor size of 128×100 pixels is utilized. Pixels are indexed from the top left corner. FIG. 15 illustrates an example pixel index utilized in the examples described below. In accordance with aspects of the present invention, a morphological approach is used to separate the LCD grid mask.

Figure 16:
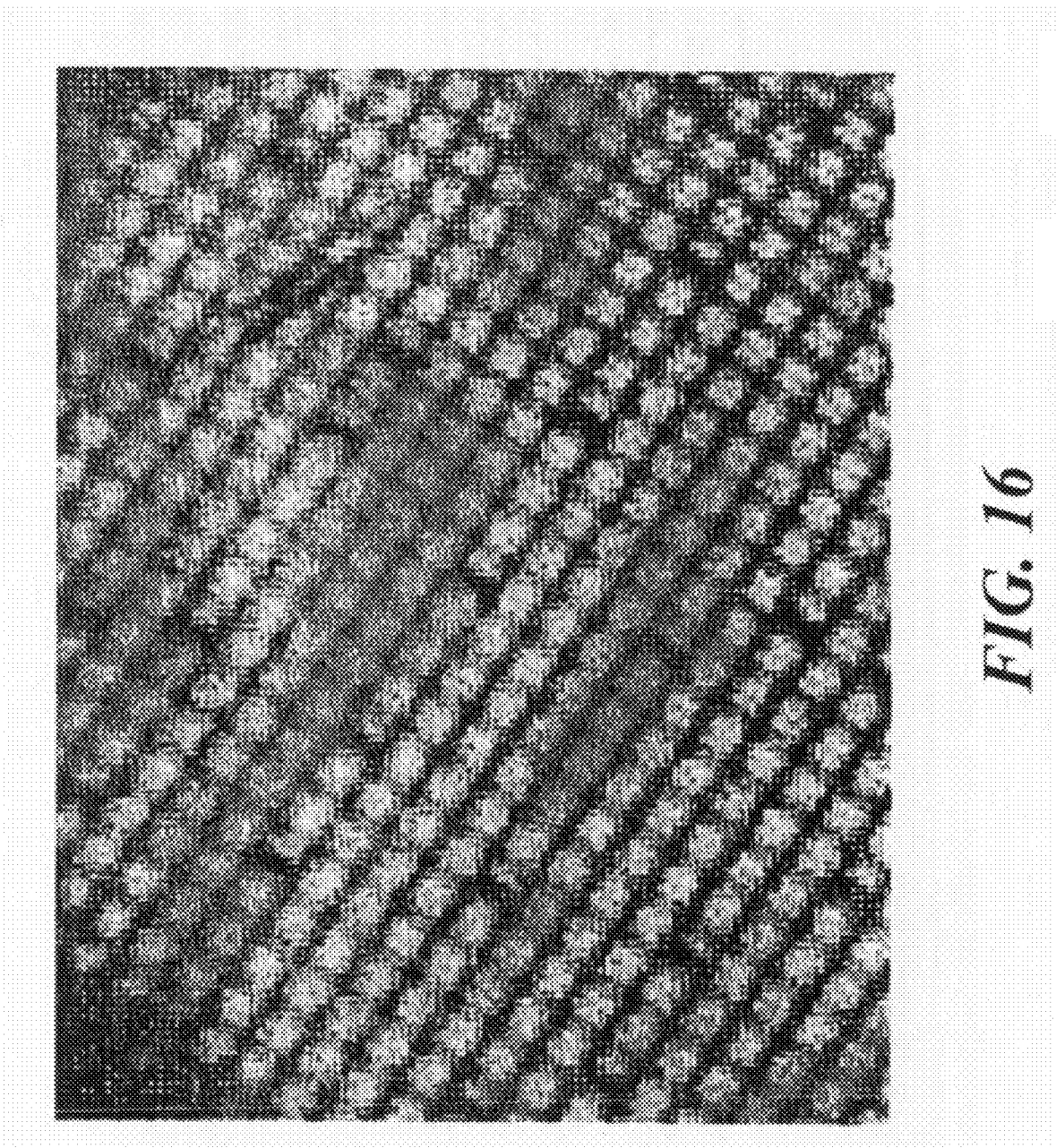
FIG. 16 illustrates an example of a mask $M_1$ with pixels that lie on the edge and vertex of LCD grids in accordance with at least one aspect of the present invention.

First, pixels that lie on the edge and vertex of the LCD grids are separated. The size of an LCD grid cell in a captured image is known roughly. Therefore, a rough ratio is determined so that the number of pixels that lie on the edge or vertex of the LCD grids in a small block may be estimated. For example, the ratio may be determined to be ⅔. The grey level value of pixels that lie on the edge or vertex of the LCD grids is lower than the grey level values of the pixels that lie on the center of grids. From this information, the captured image may be divided into small blocks, e.g., the block size may be 6×6, and the darkest 24 pixels (⅔*6×6) may be selected as the estimated pixels that form the LCD grids. FIG. 16 illustrates pixels that lie on the edge and vertex of the LCD grids. By dividing the image into small blocks, the pixels that lie on both edge and vertex of the LCD grids are separated as a mask $M_1$. A mask such as $M_1$ is a binary array the same size as the captured image; 1 means valid and 0 means invalid. If a pixel (x,y) lies on an edge or vertex of the LCD grids, then $M_1$ (x,y) is equal to 1, else $M_1$ (x,y) is equal to 0.

The next step is the binary erosion of the mask $M_1$. A binary erosion operator may be used in this step. The input of the operator is the mask $M_1$ obtained in the last step and the output is a new mask $M_2$. For each pixel (x,y), $M_2$(x,y) is equal to 1 if $M_1$(x,y) is equal to 1 and there are 3 or more neighboring pixels of (x,y), which equal to 1, else $M_2$(x,y) is equal to 0. The concept and associated algorithms of binary erosion is readily understood by those skilled in the art.

Figure 18:
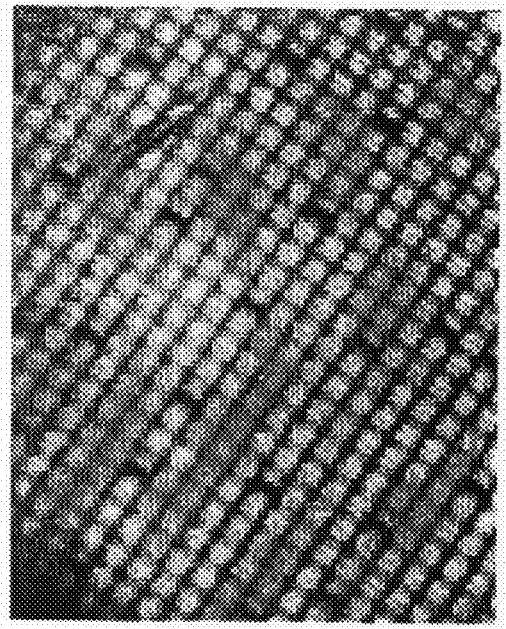
FIG. 18 illustrates an example of a mask $M_2$ eroded from mask $M_1$ in accordance with at least one aspect of the present invention.

Two pixels are neighbors to each other if they are directly below, above, or next to each other. FIG. 17 shows neighboring pixels in accordance with aspects of the present invention. Pixel 1701 is a given pixel (x,y). Pixels 1703, 1705, 1707, and 1709 are neighboring pixels of pixel (x,y) 1701. Some neighboring pixels are shown in the cardinal directions (up, down, left, right) of pixel 1701. Others, pixels 1702, 1704, 1706, and 1708, are on the diagonals from pixel 1701. By using a binary erosion operator, many pixels that lie on the edge of grids are thrown off, as shown by mask $M_2$ in FIG. 18.

The third step of pre-processing includes separating large connected regions of mask $M_2$. Two new masks $M_3$ and $M_4$ are obtained by judging the size of connected regions of the mask $M_2$. Mask $M_3$(x,y) is equal to 1 if pixel (x,y) belongs to the small size, e.g., size <15, connected regions of mask $M_2$. Mask $M_4$(x,y) is equal to 1 if (x,y) belongs to the large size, e.g., size ≧15, connected regions of mask $M_2$. Connected regions are identified as $R_t$, where t=1, 2, ..., T, $R_t=\{(x_i,y_i) | M_2(x_i,y_i)=1, (x_i,y_i)$ are neighbors$\}$, the size of a connected region means the count of pixels in the region.

Figure 19:
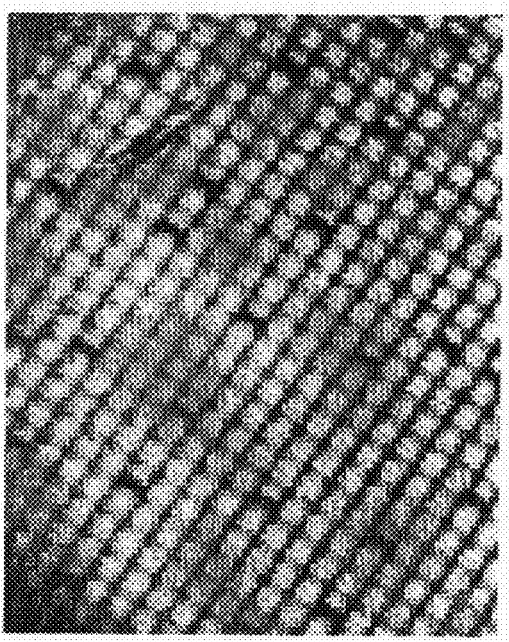
FIG. 19 illustrates an example of a mask $M_3$ in accordance with at least one aspect of the present invention.
Figure 20:
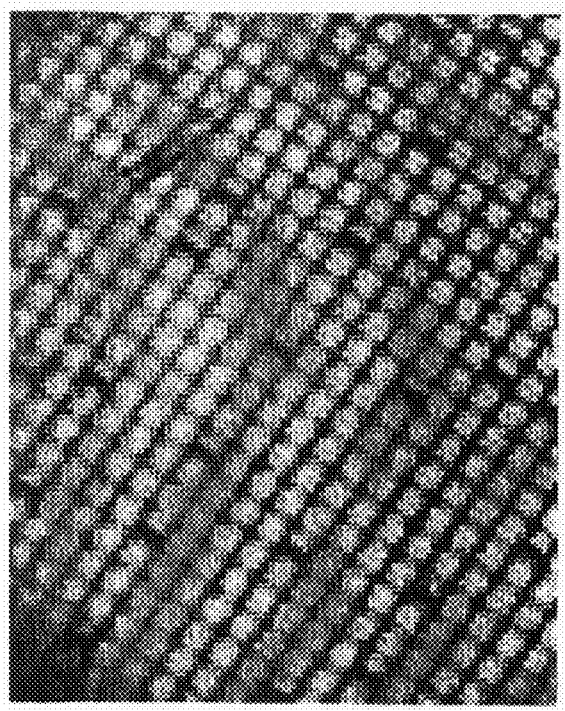
FIG. 20 illustrates an example of a mask $M_4$ in accordance with at least one aspect of the present invention.

If mask $M_3$(x,y) is equal to 1, the pixel (x,y) is considered to lie on the vertex of the LCD grids, as shown by the pixels in FIG. 19. The pixels that lie on the large connected regions, as represented by mask $M_3$ and as the pixels shown in FIG. 20, are further processed in the next step.

Figure 21:
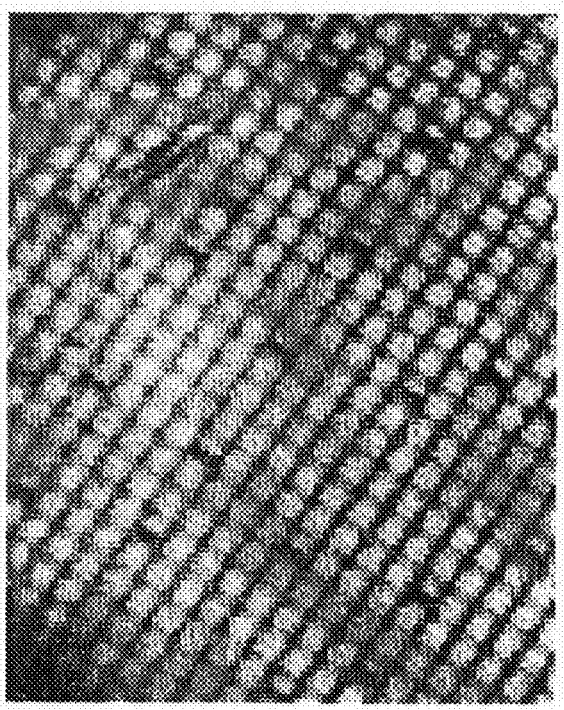
FIG. 21 illustrates an example of a mask $M_5$ in accordance with at least one aspect of the present invention.
Figure 22:
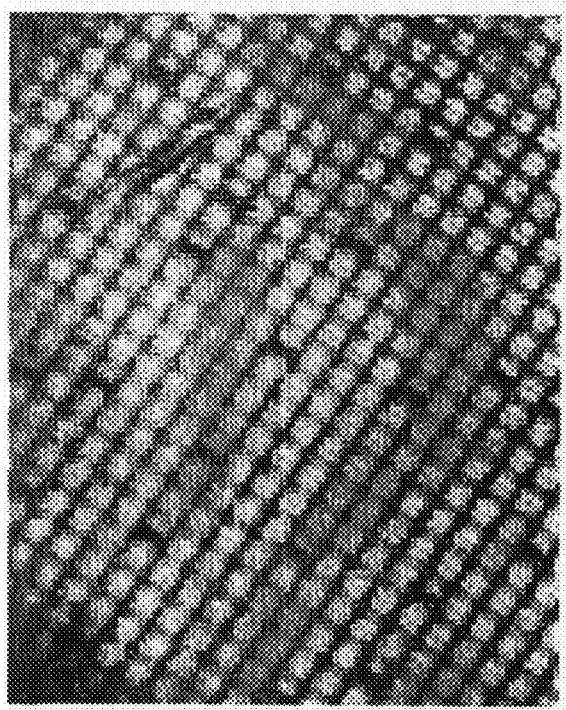
FIG. 22 illustrates an example of a mask $M_6$ in accordance with at least one aspect of the present invention.

The fourth step of pre-processing includes thinning the mask $M_4$. Mask $M_4$ is processed by another binary erosion operator and a new mask $M_5$ is obtained. Mask $M_5$(x,y) is equal to 1 if $M_4$(x,y) is equal to 1 and the value of 3 or 4 neighbor pixels of (x,y) in mask $M_4$ are equal to 1. The pixels that belong to the small connected regions of $M_5$ form another mask $M_6$. Mask $M_5$ and mask $M_6$ are illustrated in FIGS. 21 and 22 respectively. The LCD grid mask is obtained by merging the mask $M_3$ and mask $M_6$, as shown in FIG. 14.

Figure 23:
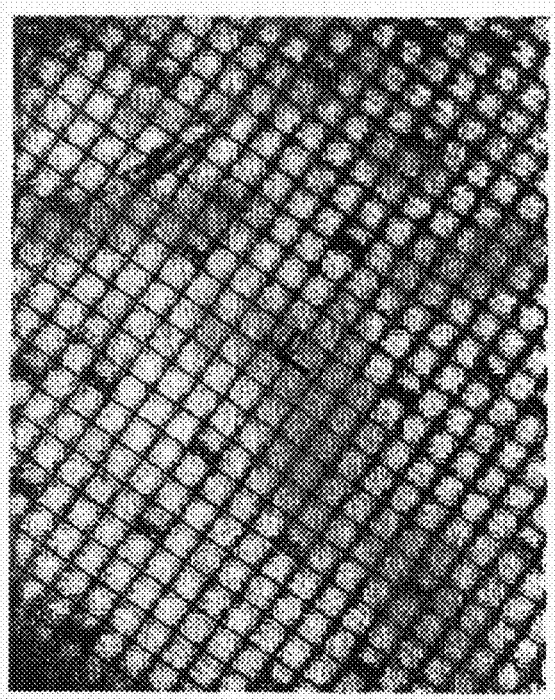
FIG. 23 illustrates an example of LCD-pixel grid analysis when applied to mask $M_6$ in accordance with at least one aspect of the present invention.

The second step of vision processing, LCD-pixel grid analysis, is described below. As FIG. 23 shows, using the result of pre-processing, LCD-pixel grid analysis may be applied to retrieve the accurate perspective LCD pixel grid. It is understood by those skilled in the art that various methods may be used for LCD-pixel grid analysis. One example method for LCD-pixel grid analysis is described below.

EIC pattern analysis obtains a homography matrix describing the perspective transform from a grid to an image. A perspective transform is a planar transform that is a perspective projection. With a perspective transform, a line is still a line. Parallel lines may not be parallel anymore. Instead, they may appear to converge to a vanishing point. To obtain the perspective transform, the affine transform is first obtained. Then, the affine transform is used as an initial estimate of perspective transform, and a perspective transform is determined. An affine transform keeps evenly spaced parallel lines evenly spaced and parallel, but perpendicular lines may not remain perpendicular. This step obtains the rotation, scale (distance between parallel lines) and translation (distance between the origins) of the affine transform. The output of this step is a homography matrix that describes the affine transform.

First, the system finds two main directions of EIC symbols. This step looks at all the directions formed by pairs of connected effective EIC pattern regions and finds two directions that occur the most often.

As described above, given effective EIC pattern mask, regions $R_t$, where t=1, 2, ..., T, of pixels $(x_i, y_i)$ are identified:

$R_t=\{(x_i,y_i) | \text{EIC Pattern Mask } (x_i,y_i)=1, (x_{i,y_i})$ are neighbors$\}$.

Next, gray-level centroids of the regions are identified. For each region $R_t$, where t=1, 2, ..., T, gray-level centroid $(\bar{x}_t, \bar{y}_t)$ is:

$$\bar{x}_t = \frac{1}{\sum_{i=0}^{N_t} G(x_i, y_i)} \sum_{i=0}^{N_t} (x_i \cdot G(x_i, y_i))$$

-continued $$\bar{y}_t = \frac{1}{\sum_{i=0}^{N_t} G(x_i, y_i)} \sum_{i=0}^{N_t} (y_i \cdot G(x_i, y_i))$$

where $(x_i, y_i)$ is a pixel in region $R_t$, $G(x_i, y_i)$ is the gray-level of the pixel, and $N_t$ is the total number of pixels in region $R_t$.

Figure 24:
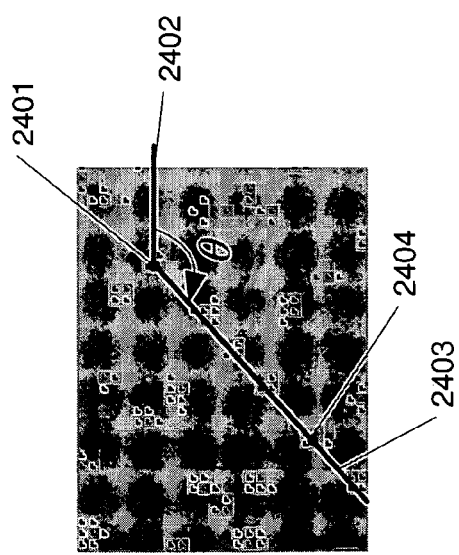
FIG. 24 illustrates two coordinate systems in accordance with at least one aspect of the present invention.

Third, for each pair of regions, $R_u$ and $R_v$, a direction of the pair is obtained:

$$\theta_{u,v} = \arctan\left(\frac{\bar{y}_u - \bar{y}_v}{\bar{x}_u - \bar{x}_v}\right)$$

where $0 \leq \theta_{u,v} < 180$. FIG. 24 shows an example of θ. Here, θ is a rotation about point 2401 from horizontal line 2402 to a line 2403 connecting centroids 2401 with another centroid 2404. The determination of angle θ may be performed for all centroids from all centroids in the capture image.

Once all the directions are obtained, a histogram of directions can be created. The X axis is θ. The Y axis is the frequency count of θ.

Next, the histogram is first normalized using template [−0.1, −0.1, −0.1, −0.1, −0.1, 0, 0, 0, 1, 0, 0, 0, −0.1, −0.1, −0.1, −0.1, −0.1]. That is, for every x, where x=0, 1, ..., 179, $$Y(x) = \sum_{i=0}^{16} (\text{template}[i] \cdot Y(\text{mod}(x + i - 8, 180)))$$

mod(x,y) is a function that returns the positive remainder of x divided by y. For example, mod(3,2)=1 mod(−3,2)=1.

Next, four candidates of the main directions are identified. The X value that has the highest Y value is set as Candidate 1. Y values of adjacent X are suppressed to 0, i.e. Y(x)=0, where x is in the range of mod(Candidate 1±30,180) Find the next X value with the highest Y value and set as Candidate 2. Y values of adjacent X are suppressed to 0, i.e. Y(x)=0, where x is in the range of mod(Candidate 2±30,180). Repeat the process to find Candidate 3 and Candidate 4. The reason for the suppression of the regions is that these angles are where EIC symbols are not expected to lie.

From the 4 candidates, 2 pairs of near perpendicular directions are identified. That is, for a candidate $x_i$, select another candidate $x_j$, such that abs(90−abs($x_i$−$x_j$)) is minimized. abs(x) is a function that returns the absolute value of x. For example, abs(1.8)=1.8, abs(−1.8)=1.8

Now, select $(x_i, x_j)$ such that $Y(x_i) + Y(x_j)$ is maximized.

Given the pair selected, $(x_i, x_j)$, centroid of a small area near $x_i$ and $x_j$ is calculated:

$$\bar{x}_i = \frac{\sum_{k=-5}^{5} (\text{mod}(x_i + k, 180) \cdot Y(\text{mod}(x_i + k, 180)))}{\sum_{k=-5}^{5} Y(\text{mod}(x_i + k, 180))}$$

-continued $$\bar{x}_j = \frac{\sum_{k=-5}^{5} (\text{mod}(x_j + k, 180) \cdot Y(\text{mod}(x_j + k, 180)))}{\sum_{k=-5}^{5} Y(\text{mod}(x_j + k, 180))}$$

The two centroids are the two main directions. That is, suppose $\bar{x}_i < \bar{x}_j$, $\theta_h = \bar{x}_i$, and $\theta_v = \bar{x}_j$.

Next, the system determines the scale and translation for the EIC symbols.

In the step, one looks for the scale and translation of the affine transform. Scale is the distance between two adjacent parallel lines. Translation is the distance between the image center and the origin of the coordinate system formed by the grid lines. Both scale and translation are measured in pixels.

Figure 25:
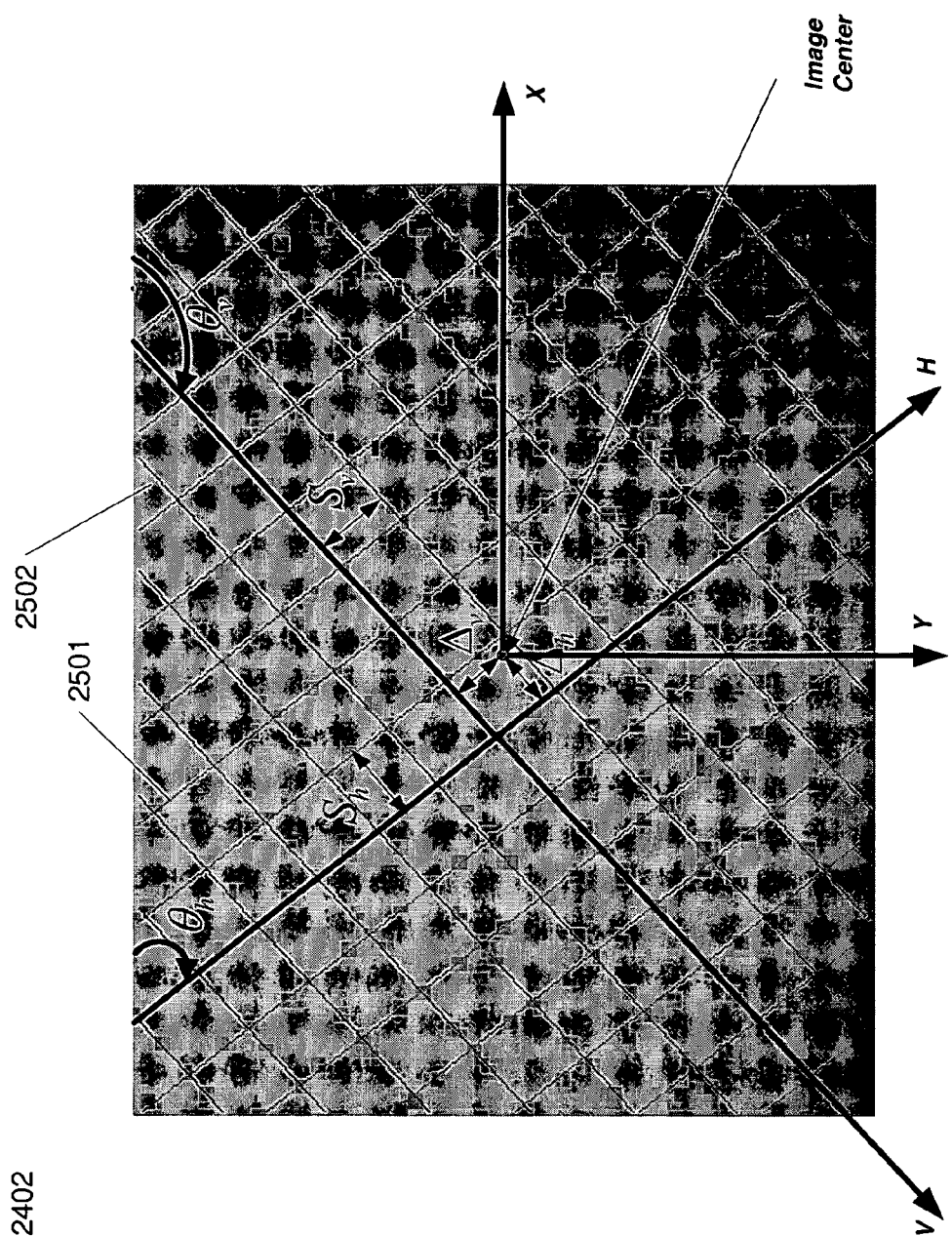
FIG. 25 illustrates effective embedded interaction coding pixels in accordance with at least one aspect of the present invention.

FIG. 25 shows the affine transformed grid lines. The two main directions are: $\theta_h, \theta_v$. The two scales along the two directions are: $S_h, S_v$. The two translations are: $\Delta_h, \Delta_v$.

Note that the H, V coordinate system shown in FIG. 25 is the coordinate system of the grid. Grid lines are not seen in image. But as explained before, if one assumes an affine transform is from a paper plane to an image plane, the EIC pattern in the image may appear to lie on grid lines that are an affine transform of the grid lines in the EIC symbol array. Therefore, one can draw grid lines in image (the gridlines parallel to lines 2501 and 2502) and the H, V coordinate system based on an affine transform of the grid lines in EIC symbol array.

The X, Y coordinate system shown in FIG. 25 is the coordinate system of the image. Facing the image, the X- is always horizontal and Y is always vertical. The image center is the origin of the X, Y coordinate system.

To obtain the two scales $S_h$, $S_v$, the image may be rotated counterclockwise with $\theta_h, \theta_v$ respectively.

From here, with the affine transform obtained, the perspective transform may be obtained from the affine transform. It should be understood by those skilled in the art that there are a number of different way in which to retrieve the LCD grid and that the examples provided herein are but illustrative examples. After successfully retrieving the LCD grid, three algorithms apply the grid and image to recognize the embedded EIC information: EIC symbol orientation; symbol analysis; and EIC bits extraction. First, to determine the EIC symbol orientation in the image, steps may be utilized as described below.

Figure 26:
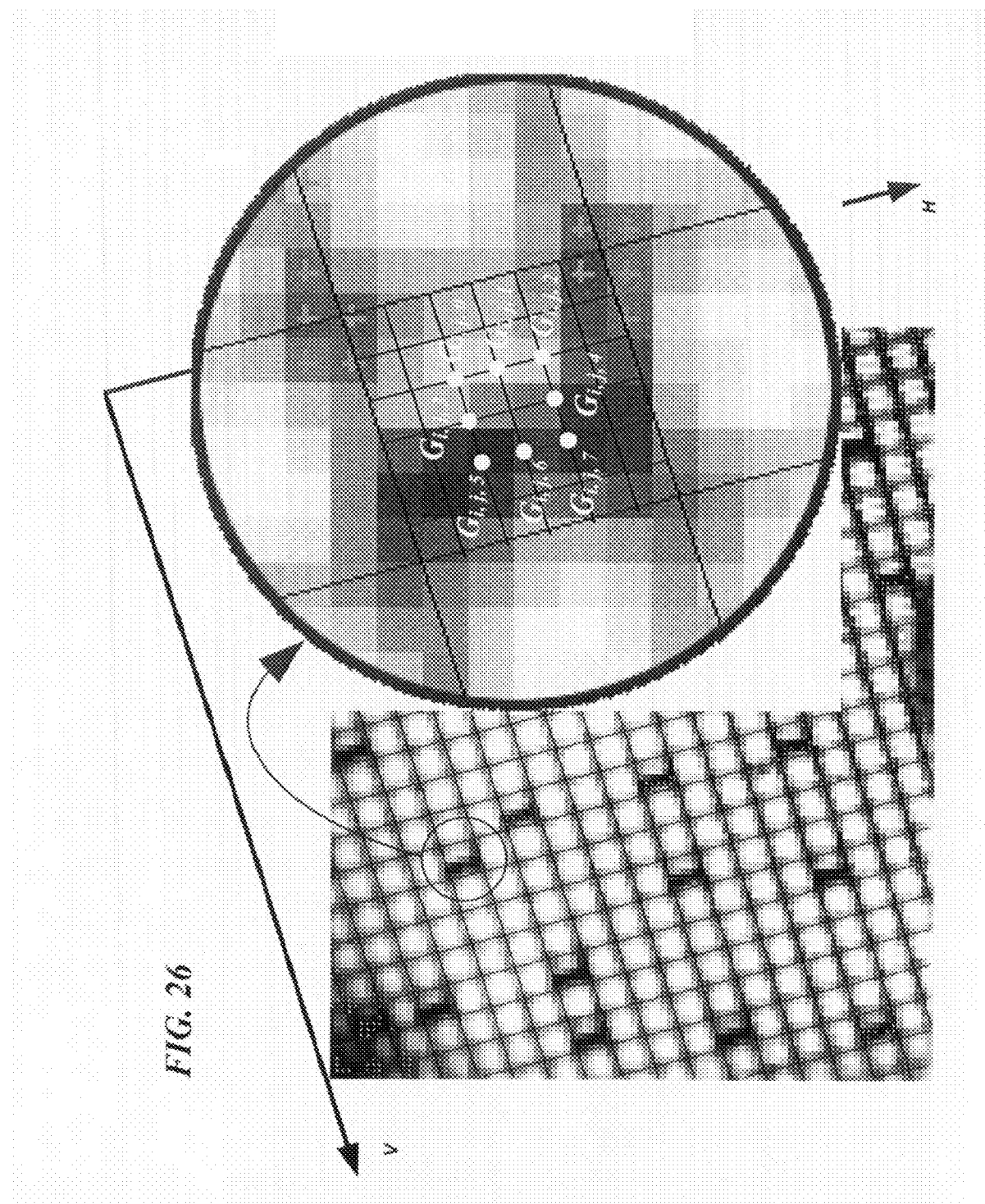
FIG. 26 illustrates an example LCD pixel grid showing 8 sampling points taken within the grid in accordance with at least one aspect of the present invention.

As shown in FIG. 26, eight (8) points of each LCD pixel are sampled. The positions $(h_{i,j,p}, v_{i,j,p})$ of the 8 sampling points $G_{i,j,p}(0 \leq p \leq 7)$ in each LCD pixel grid (i,j) are:

$$\left(\frac{1}{3}, \frac{1}{3}\right), \left(\frac{1}{2}, \frac{1}{3}\right), \left(\frac{2}{3}, \frac{1}{3}\right), \left(\frac{1}{3}, \frac{1}{2}\right), \left(\frac{2}{3}, \frac{1}{2}\right), \left(\frac{1}{3}, \frac{2}{3}\right), \left(\frac{1}{2}, \frac{2}{3}\right) \text{ and}$$

$$\left(\frac{2}{3}, \frac{2}{3}\right).$$

In accordance with aspects of the present invention, the LCD pixel grid is valid only if 8 sampling points are all valid. The sampling algorithm may include bilinear sampling.

Next, the average grey-level difference $D_{i,j,q}(0 \leq q \leq 3)$ of four orientations for each valid LCD pixel grid is calculated. One method for calculating the grey-level difference follows the equation:

$$\begin{cases} D_{i,j,0} = \frac{(G_{i,j,0} + G_{i,j,3} + G_{i,j,5}) - (G_{i,j,2} + G_{i,j,4} + G_{i,j,7})}{3} \\ D_{i,j,1} = \frac{(G_{i,j,0} + G_{i,j,1} + G_{i,j,2}) - (G_{i,j,5} + G_{i,j,6} + G_{i,j,7})}{3} \\ D_{i,j,2} = \frac{(G_{i,j,2} + G_{i,j,4} + G_{i,j,7}) - (G_{i,j,0} + G_{i,j,3} + G_{i,j,5})}{3} \\ D_{i,j,3} = \frac{(G_{i,j,5} + G_{i,j,6} + G_{i,j,7}) - (G_{i,j,0} + G_{i,j,1} + G_{i,j,2})}{3} \end{cases}$$

Figure 28:
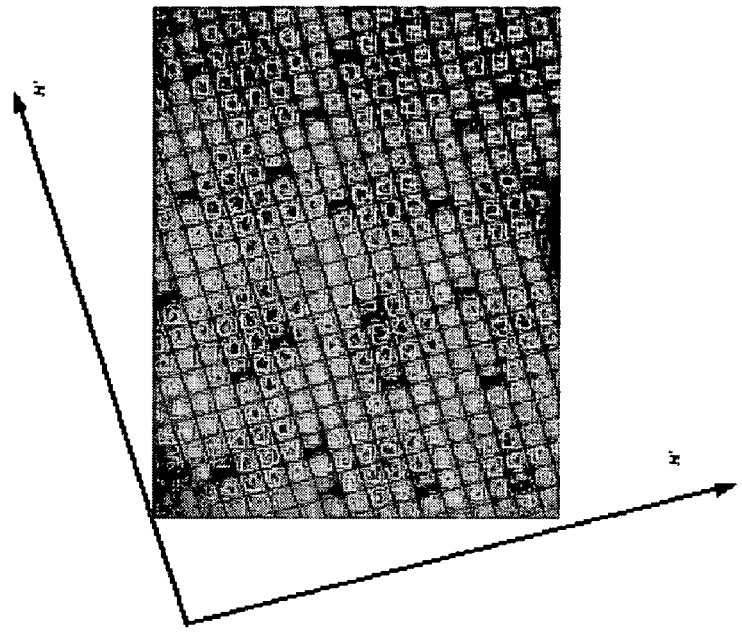
FIGS. 27 and 28 illustrate an example of how a reference frame for the LCD pixel grids is redefined so that an axis is consistent with an ideal reference frame in accordance with at least one aspect of the present invention.
Figure 27:
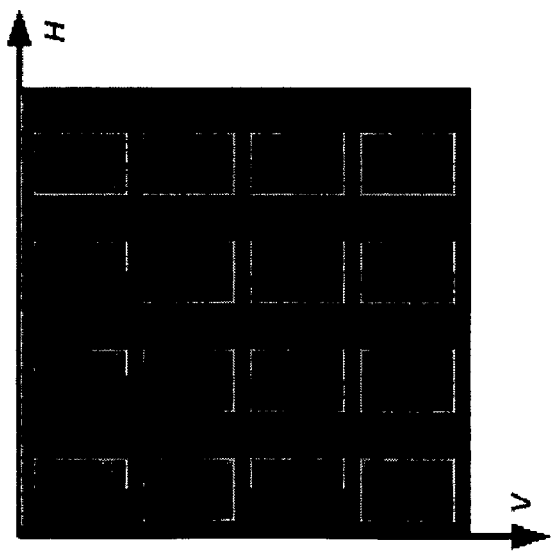
Figure 29:
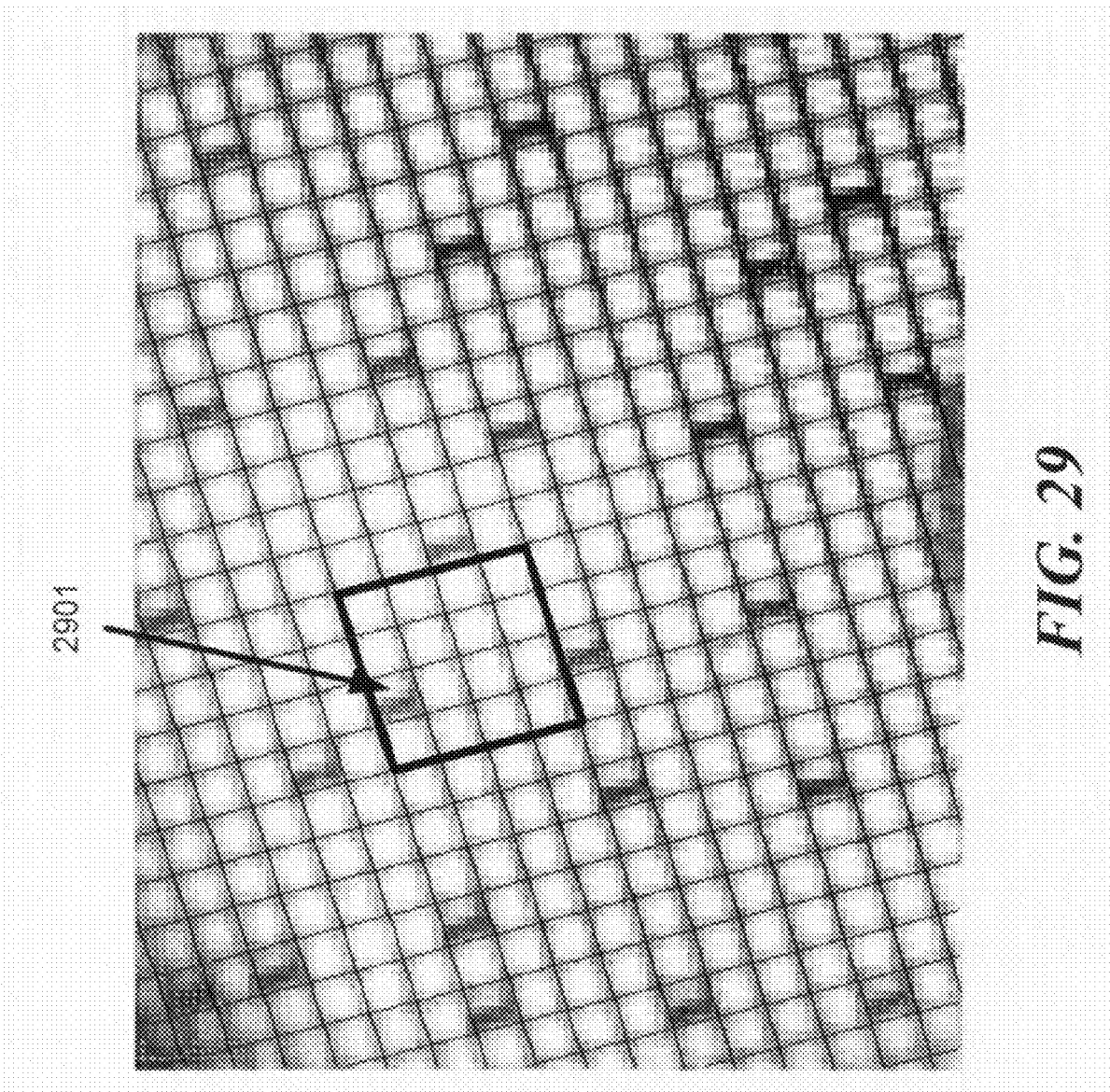
FIG. 29 illustrates an example LCD pixel with the smallest average grey-level difference of four orientations for the LCD pixel as determined in accordance with at least one aspect of the present invention.
Figures 30A, 30B, 30C, 30D:
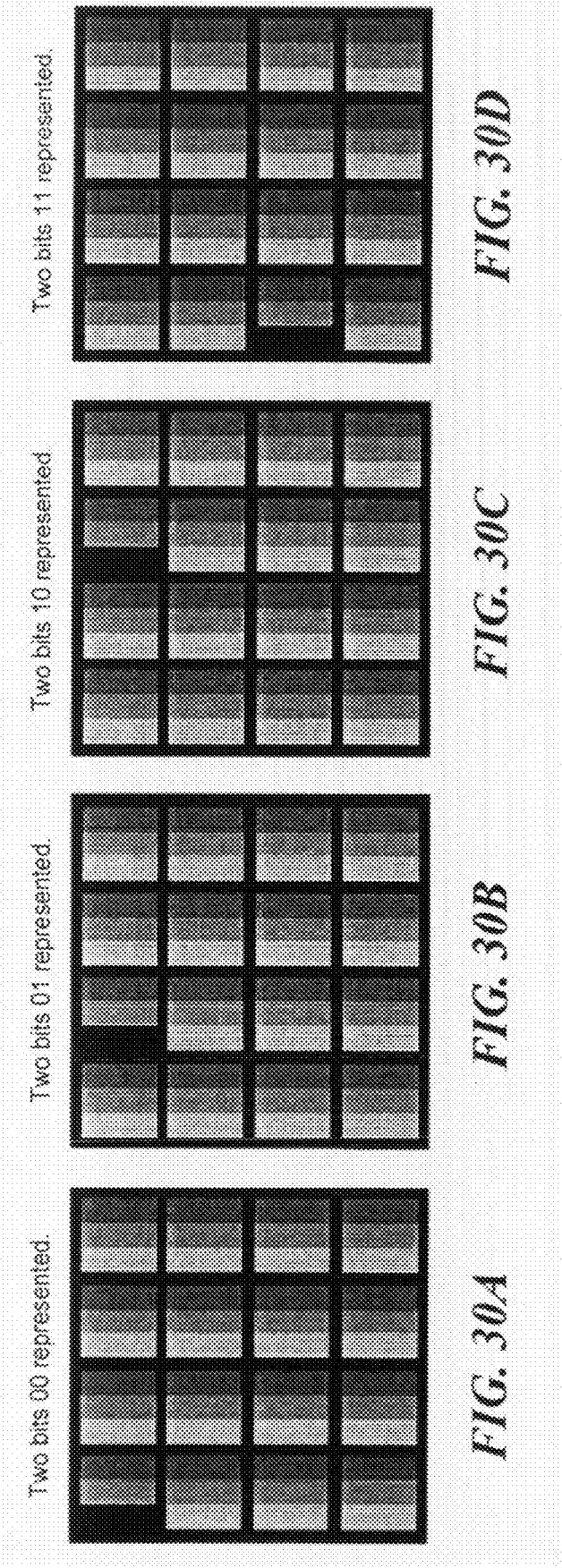
FIGS. 30A-30D illustrate four interpretation bits in an EIC symbol in accordance with at least one aspect of the present invention.

Then, smallest 25 differences $D_{i,j,q}$ for each orientation q from all valid LCD pixel grids are selected and their average grey-level difference $D_q(0 \leq q \leq 3)$ of each orientation is averaged. The threshold 25 is the average visible EIC symbol on an LCD in a captured image by a camera. It should be understood by those skilled in the art that the threshold value of 25 is one illustrative value, but other smaller or larger values may be utilized. Next, most possible correct orientation q, which has the smallest $D_q$ ($0 \leq q \leq 3$), is determined. As shown in FIGS. 27 and 28, the reference frame for the LCD pixel grids is redefined so that an axis is consistent with an ideal reference frame. Finally, the average grey-level difference $D_{i,j,0}$ of all valid LCD pixel grids is recalculated in the new reference frame.

The second algorithm to recognize the embedded EIC information is symbol analysis. EIC symbol orientation has been determined above; however, the EIC symbol on the LCD reference alignment remains unknown. For symbol analysis, two algorithms may be used to retrieve horizontal and vertical alignment respectively. First, the smallest 25 differences $D_{i,j,0}$ from all valid LCD pixel grids are selected. The threshold 25 is the average visible EIC symbol on an LCD in a captured image by a camera. It should be understood by those skilled in the art that the threshold value of 25 is but one value and other smaller or larger values may be utilized.

Then, EIC symbol horizontal alignment is calculated. First, a histogram count $H_p(0 \leq p \leq 3)$ of the selected $D_{i,j,0}$ is obtained by Mod(j,4). Second, the correct horizontal alignment position is obtained as the histogram index p with the biggest value $H_p(0 \leq p \leq 3)$ Next, EIC symbol vertical alignment is calculated. First, a histogram count $V_p(0 \leq p \leq 3)$ of the selected $D_{i,j,0}$ is obtained by Mod(i,4). Second, the correct vertical alignment position is obtained as the histogram index p with the biggest value $V_p(0 \leq p \leq 3)$.

Figure 31:
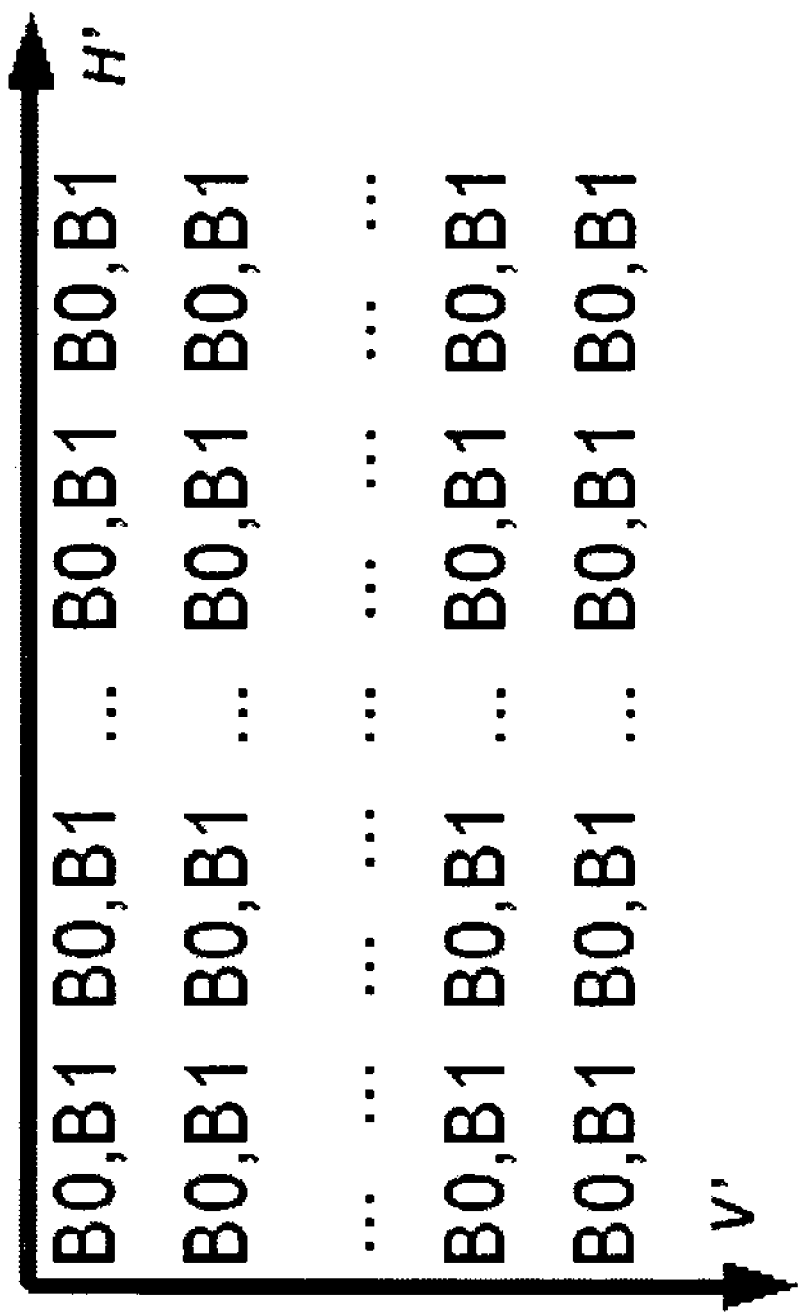
FIG. 31 illustrates example bit arrays that are constructed from retrieved bits in accordance with at least one aspect of the present invention.

Finally, the third algorithm to recognize the embedded EIC information is the EIC bits extraction algorithm, where EIC bits for each EIC symbol in the image are calculated. First, as shown in FIG. 26, the smallest $D_{i,j,0}$ 2601 of four possible information LCD pixels for each EIC symbol is identified. Second, two EIC bits $(B_1 B_0)$ are retrieved from the EIC symbol as shown in FIGS. 30A-30D. Finally, bit arrays are constructed from the retrieved bits such as shown in FIG. 31.

The extracted EIC bits are a piece of single m-array bits that are used to decode x-y position data and/or metadata information. It should be understood by those skilled in the art that various methods may be used for EIC decoding of the EIC bit stream. One example method for EIC decoding of the EIC bit stream is described below.

In order to determine the position of an image relative to an LCD using an m-array, it is necessary to determine the position of a bit captured in the bit relative to the m-array. That is, it is necessary to determine if the bit is the first bit, second bit, etc. in the m-sequence to determine the position of the bit in the m-array.

For any number s, where $0 \leq s \leq 2^n - 1$, there exists a unique polynomial r(x), where $$r(x) = \sum_{i=0}^{n-1} r_i x^i$$

whose order is less than n, such that $x^s \equiv r(x) \pmod{P_n(x)}$, and vice versa. In other words, there is a one-to-one relationship between s and r(x). Thus, $x^s/P_n(x)$ and $r(x)/P_n(x)$ will generate the same m-sequence. For convenience, setting Q(x)=1, m can be assumed to be the m-sequence generated by $1/P_n(x)$. If a bit is the s'-th bit of m, where $0 \leq s' < 2^n - 1$, the m-sequence that starts from that bit is $R = \sigma^{-s'}(m) = \sigma^{2^n-1-s'}(m) = \sigma^s(m)$, where $s = 2^n - 1 - s'$. R corresponds to division $x^s/P_n(x)$.

As previously noted, there exists $$r(x) = \sum_{i=0}^{n-1} r_i x^i,$$

that satisfies $r(x) \equiv x^s \pmod{P_n(x)}$. R also corresponds to $r(x)/P_n(x)$. Letting $m = (m_0\ m_1\ \ldots\ m_i\ \ldots\ m_{2^n-3}\ m_{2^n-2})^t$ (where the superscript t stands for vector or matrix transpose), and $\sigma^i(m^t) = (m_{2^n-1-i}\ m_{2^n-i}\ \ldots\ m_0\ m_{2^n-3-i}\ m_{2^n-2-i})$, $r(x)/P_n(x)$ and $1/P_n(x)$ will have the following relationship:

$$r(x)/P_n(x) = \left(\sum_{i=0}^{n-1} r_i x^i\right) / P_n(x) = \sum_{i=0}^{n-1} [r_i x^i / P_n(x)] = \sum_{i=0}^{n-1} r_i [x^i \cdot 1/P - n(x)].$$

With R corresponding to $r(x)/P_n(x)$, and $\sigma^i(m)$ corresponding to $x^i \cdot 1/P_n(x)$, then, $$R^t = r^t \hat{M}$$

where R is the m-sequence that starts from the s-th bit of m, $r = (r_0\ r_1\ r_2\ \ldots\ r_{n-1})^t$ are the coefficients of r(x), and $$\hat{M} = \begin{pmatrix} m^t \\ \sigma(m^t) \\ \vdots \\ \sigma^{n-1}(m^t) \end{pmatrix}.$$

Again, the addition and multiplication operations are binary operations, i.e., addition is XOR and multiplication is AND.

If an image captures K bits $b = (b_0\ b_1\ b_2\ \ldots\ b_{K-1})^t$ of m(K≥n), and the relative distances between the positions of the bits in the m-sequence are: $s_i = d(b_i, b_0))$, where i=0, 1, ..., K-1 and $s_0 = 0$, selecting the $s_i+1$-th bits of R and the $s_i+1$-th columns of M will result in:

$$b^t = r^t M$$

where $b^t$ is the transpose of b, M is a sub-matrix of $\hat{M}$ and consists of the $s_i+1$-th columns of $\hat{M}$, where i=0, 1, 2, ..., K-1.

If M is a non-degenerate matrix and b does not contain error bits, then r can be solved by selecting n bits from b by solving for:

$$r^t = b^t \tilde{M}^{-1}$$

where $\tilde{M}$ is any non-degenerate n×n sub-matrix of M, and $\tilde{b}$ is the corresponding sub-vector of b consisting of the selected n bits.

In most cases, however, an image cannot capture a set of bits b that does not contain error bits. For example, improper illumination, document content, dust and creases can all obscure the visual representation of bits in an image, preventing these bits from being recognized or causing the value of these bits to be improperly recognized. The solution of r becomes difficult when there are error bits in b. Further, decoding becomes even more difficult because the coefficient matrix M is not fixed when the pen moves, changing the image from frame to frame. Moreover, the structure of M is irregular. Therefore, traditional decoding algorithms cannot effectively be applied to solve r under practical circumstances.

To address these difficulties, stochastic solution techniques provide a high decoding accuracy under practical conditions. As will be described in more detail, these techniques solve the equation $b^t = r^t M$ incrementally so that many solution candidates are readily available without having to solve this equation exactly.

According to various examples of the invention, independent n bits (i.e., the sub-matrix consisting of the corresponding columns of M is non-degenerate) are randomly selected from the group of b that are captured in an image of a document. Supposing that $b^{(0)}$ are the n bits chosen, a solution for r can then be obtained as:

$$[r^{(0)}]^t = [b^{(0)}]^t [M^{(0)}]^{-1}$$

where $M^{(0)}$ contains the corresponding columns of the array M for the chosen bits.

For simplicity, the n bits chosen from b to make up $b^{(0)}$ can be moved to the beginning of b, with the remaining bits making up b moved to the end of b. This leads to the relationship $$([b^{(0)}]^t, [\bar{b}^{(0)}]^t) = [r^{(0)}]^t (M^{(0)}, \bar{M}^{(0)}) + (0_n^t, [e^{(0)}]^t)$$

where $b^{(0)}$ are the chosen n bits, $\bar{b}^{(0)}$ are the remaining bits from the set b, $M^{(0)}$ is the corresponding columns of M for the chosen bits, $\bar{M}^{(0)}$ is the corresponding columns of M for the remaining bits, $0_n^t = (0\ 0\ \ldots\ 0)_{1 \times n}$, $[r^{(0)}]^t = [b^{(0)}]^t [M^{(0)}]^{-1}$, and $[e^{(0)}]^t = [\bar{b}(0)]^t + [r^{(0)}]^t \bar{M}^{(0)}$.

The value $(0_n^t, [e^{(0)}]^t)$ refers to the "difference vector" between $([b^{(0)}]^t, [\bar{b}^{(0)}]^t)$ and $[r^{(0)}]^t (M^{(0)}, \bar{M}^{(0)})$, or simply the different vector of $r^{(0)}$, and the number of 1's in $(0_n^t, [e^{(0)}]^t)$ is called the number of different bits. The vector containing different bits between $([b^{(0)}]^t, [\bar{b}^{(0)}]^t)$ and $[r^{(0)}]^t (M^{(0)}, \bar{M}^{(0)})$ alternately can be identified as $D^{(0)}$. If $D^{(0)} = (0_n^t, [e^{(0)}]^t)$, then the number $d^{(0)}$ of 1's in $D^{(0)}$ is $d^{(0)}$=HammingWeight$(D^{(0)})$=HammingWeight$(e^{(0)})$. That is, $d^{(0)}$ is the number of different bits between $([b^{(0)}]^t, [\bar{b}^{(0)}]^t)$ and $[r^{(0)}]^t (M^{(0)}, \bar{M}^{(0)})$.

Next, some of the chosen bits n from the set b are switched with some of the remaining bits from the set b. In particular, J bit pairs $(k_j, l_j)$ are switched between the original chosen bits n and the remaining bits from the set of bits b, where $k_1 \neq k_2 \ldots \neq k_j \leq n$, $n < l_1 \neq l_2 \neq \ldots \neq l_j \leq K$. It should be noted that the bit order is redefined in $([b^{(0)}]^t, [\bar{b}^{(0)}]^t)$, and these bits are not maintained in their original order. The relationship between the bits before and after switching is:

$$[e^{(1)}]^t = [e^{(0)}]^t + [e^{(0)}]^t E_{l-n} [P_{R_J}^{(0)}]^{-1} (E_k^t P^{(0)} + E_{l-n}^t),$$

$$[r^{(1)}]^t = [r^{(0)}]^t + [e^{(0)}]^t E_{l-n} [P_{R_J}^{(0)}]^{-1} E_k^t [M^{(0)}]^{-1},$$

$$P^{(1)} = P^{(0)} + (E_k + P^{(0)} E_{l-n}) [P_{R_J}^{(0)}]^{-1} (E_k^t P^{(0)} + E_{l-n}^t),$$

$$[M^{(1)}]^{-1} = [M^{(0)}]^{-1} + (E_k + P^{(0)} E_{l-n}) [P_{R_J}^{(0)}]^{-1} E_k^t [M^{(0)}]^{-1},$$

where $$E_k = (e_{k_1}\ e_{k_2}\ \ldots\ e_{k_J})_{n \times J},$$

$$E_{l-n} = (e_{l_1-n}\ e_{l_2-n}\ \ldots\ e_{l_J-n})_{(K-n) \times J},$$

$$P_{R_J}^{(0)} = E_k^t P^{(0)} E_{l-n}$$

$$e_i^t = \begin{pmatrix} 0 & \ldots & 0 & \overset{i}{1} & 0 & \ldots & 0 \end{pmatrix}_{1 \times n\ or\ 1 \times (K-n)}, \text{and}$$

$$P^{(i)} = [M^{(i)}]^{-1} \bar{M}^{(i)}, i = 0, 1.$$

If the choice of $(k_j, l_j)$ is to make:

$$[e^{(0)}]^t E_{l-n} [P_{R_J}^{(0)}]^{-1} = 1_J^t,$$

where $1_J^t = (1\ 1\ \ldots\ 1)_{1 \times J}$, then $$[e^{(1)}]^t = [e^{(0)}]^t + 1_J^t (E_k^t P^{(0)} + E_{l-n}^t)$$

$$[r^{(1)}]^t = [r^{(0)}]^t + 1_J^t E_k^t [M^{(0)}]^{-1}.$$

In view of $[e^{(0)}]^t E_{l-n} [P_{R_J}^{(0)}]^{-1} = 1_J^t$ given $k_1 \neq k_2 \neq \ldots \neq k_J \leq n$, the choice of $n < l_1 \neq l_2 \ldots \neq l_J \leq K$ is as follows: $\{l_1, l_2, \ldots, l_J\} \subset \{p_1, \ldots, p_m\}$, where $\{p_1, \ldots, p_m\}$ are the indices of the 0-bits of $[e^{(0)}]^t + 1_J^t E^t P^{(0)}$, and $P_{R_J}^{(0)}$ is invertible. Therefore, if the rank of $E_k^t P^{(0)} E_{p-n}$ is less than J, then such $l_1, l_2, \ldots, l_J$ cannot be chosen, where $E_{p-n} = (e_{p_1}\_n\ e_{p_2-n} \ldots e_{p_m-n})_{(K-n) \times m}$. Choosing other $l_1, l_2, \ldots, l_J$ is equivalent to switching a smaller number of bit pairs, and therefore does not conform to the goal of switching J bits. It should be noted that, as long as the rank of $E_k^t P^{(0)} E_{p-n}$ is J, the choice of $l_1, l_2, \ldots, l_J$ will result in the identical location vector. Therefore, choosing one combination is sufficient. Moreover, as long as $P_{R_J}^{(0)}$ is invertible, the newly selected n bits are also independent.

With the above choice of $l_1, l_2, \ldots, l_J$, the number of different bits in $e^{(i+1)}$ is:

The number of 1's in $([e^{(0)}]^t + 1_J^t E_k^t P^{(0)}) + J$

It should be noted that $E_k^t P^{(0)} E_{l-n}$ actually means choosing the $k_1, \ldots, k_J$-th rows and $l_1-n, \ldots, l_J-n$-th columns of $P^{(0)}$, while $1_J^t E_k^t P^{(0)}$ actually means summing the $k_1, \ldots, k_J$-th rows of $P^{(0)}$. No matrix computation is needed.

Thus, the decoding steps can be summarized as follows. First, an independent n-bit combination is generated from the group of bits b captured in an image. It should be noted that, with various embodiments of the invention, the selection of the n-bits can be combined with bit recognition confidence techniques, to help ensure that the most accurately recognized bits are selected for the n-bit combination.

Next, the relationship $([b^{(0)}]^t, [\bar{b}^{(0)}]^t) = [r^{(0)}]^t (M^{(0)}, \bar{M}^{(0)}) + (0_n^t, [e^{(0)}]^t)$ is solved to determine $d^{(0)}$=HammingWeight$(D^{(0)})$=HammingWeight$(e^{(0)})$. If the number of different bits $d^{(0)}$ is 0, then the process is stopped and the solution $r^{(0)}$ is output. Otherwise, all J (=1 and 2) bit pairs are switched, and the number of different bits d is again determined using the relationship $([e^{(0)}]^t + 1_J^t E_k^t P^{(0)}) + J$. It should be noted, however, that this relationship can only be evaluated when the rank of $E_k^t P^{(0)} E_{p-n}$ is J. In this case there is no need to specify $l_1, l_2, \ldots, l_J$. Next, the minimal number d of different bits is determined.

The above process has to be repeated several times in order to ensure a high enough probability of successful decoding. To estimate the times of selecting the n-bit $b^{(0)}$ from b, the number r of the error bits in b is first predicted to be d. If r is changed, then $$p_s = \frac{C_r^s C_{K-r}^{n-s}}{C_K^n},$$

is computed, which is the probability that the chosen n bits contain s error bits, where $$C_a^b = \frac{a!}{b!(a-b)!}$$

is the combinatory number, and $$P_s = \sum_{i=0}^{s} p_i,$$

is the probability that the chosen n bits contain less than s+1 error bits. In practice, s=2 in order to minimize the computation load. Next, $s_2$ is computed, such that $1-(1-P_2)^{s_2} \geq P_e$, where $P_e$ is the expected probability of successful decoding. If the times S of chosen $b^{(0)}$ is equal to or larger than $s_2$, then the process is stopped and the results are output. Otherwise, the process is repeated with a new independent n-bit combination $b^{(0)}$ generated from the group of bits b captured in an image. Using this process, as long as the chosen n bits contain less than J+1 error bits, the correct solution can be found.

Figure 32:
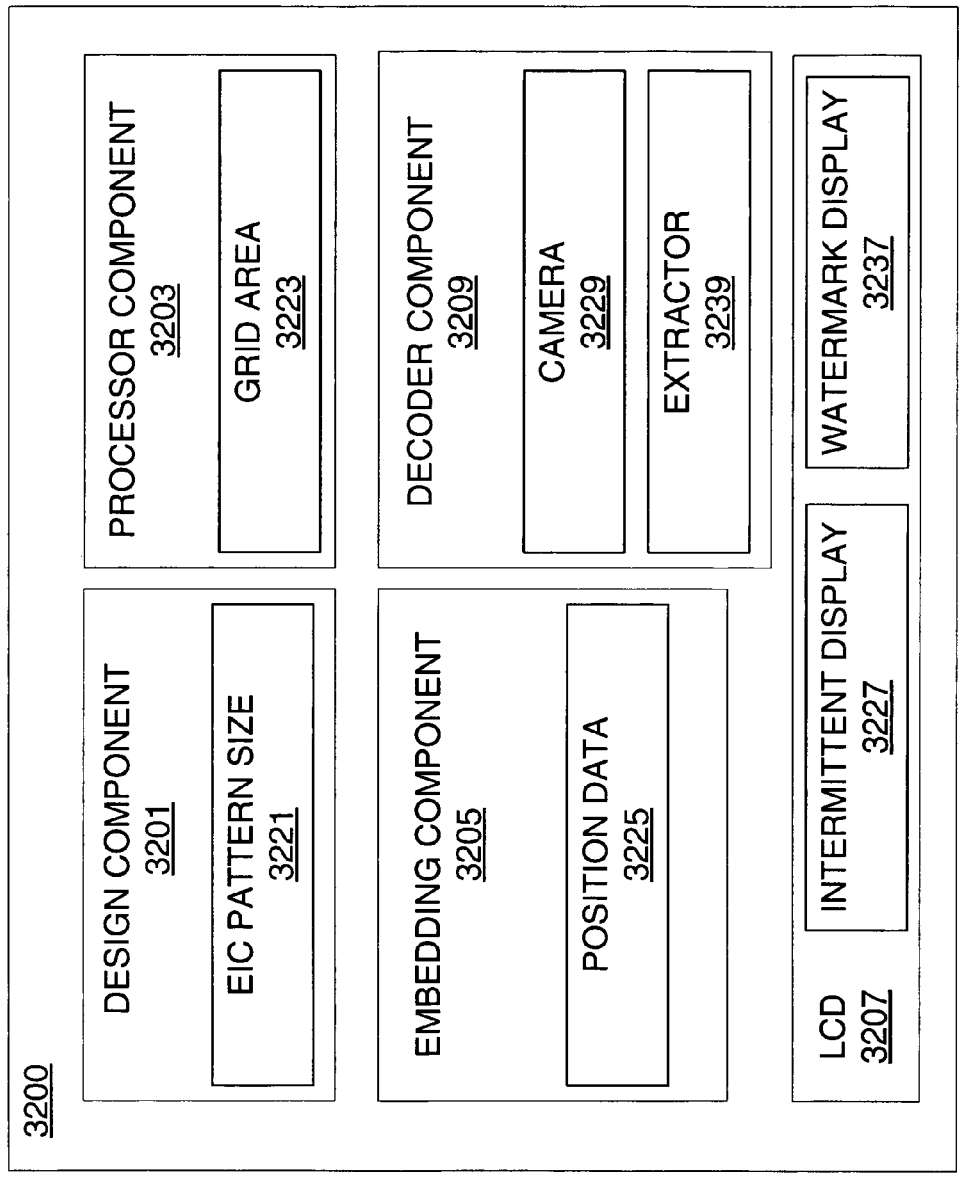
FIG. 32 is an illustrative block diagram of a system for creating an EIC pattern on an LCD in accordance with at least one aspect of the present invention.

Illustrative components for a system 3200 for creating an EIC pattern on an LCD is shown in FIG. 32. System 3200 is shown to include a design component 3201, a processor component 3203, an embedding component 3205, an LCD 3207, and a decoder component 3209. Design component 3201 may be configured to define a size 3221 of the EIC pattern for display on the LCD 3207. The size 3221 may be defined by a grid with pixels arranged into columns and rows. Processor component 3203 may be configured to determine an area 3223 of the grid for embedding position data associated with the dimensions of the LCD 3207.

Embedding component 3205 may be configured to embed the position data 3225 in the determined area of the grid. LCD 3207 may be configured to display the position data in the EIC pattern on a screen. LCD 3207 may be configured to intermittently display 3227 the EIC pattern and/or display the EIC pattern as a watermark 3237 on an underlying image associated with an application program. Decoder component 3209 may be configured to decode the embedded position data and/or metadata information. Decoder component 3209 may be configured to include a camera 3229 configured to capture an image of the EIC pattern and an extractor 3239 configured to extract the embedded position data and/or metadata information from the captured image of the EIC pattern.

Figure 33:
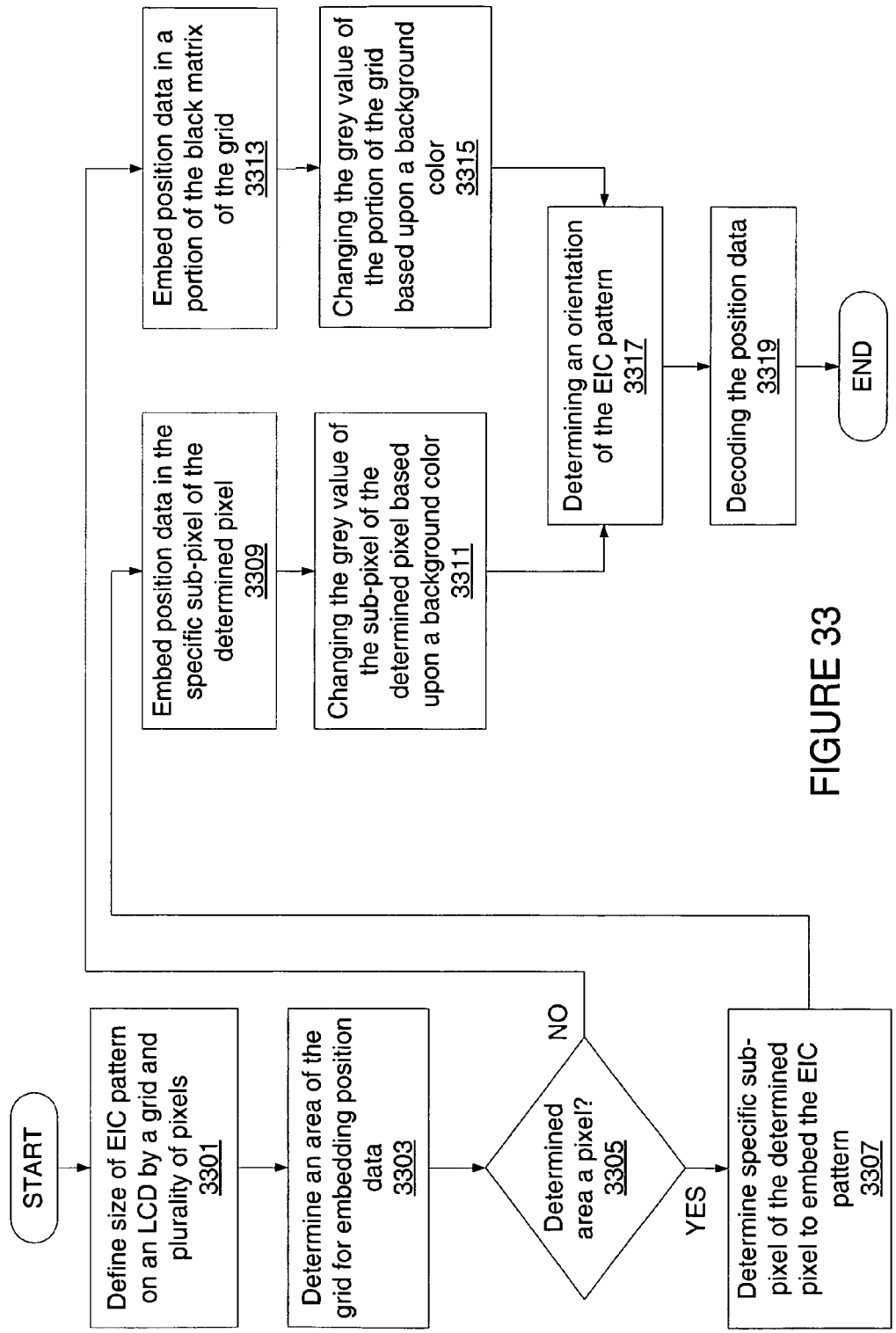
FIG. 33 is a flowchart of an illustrative method for creating an EIC pattern on an LCD in accordance with at least one aspect of the present invention.

FIG. 33 is an illustrative method for creating an EIC pattern on an LCD in accordance with at least one aspect of the present invention. The process starts at step 3301 where a size of the EIC pattern on an LCD is defined by a grid and pixels. At step 3303, an area of the grid for embedding position data and/or metadata information is determined. A determination is made at step 3305 as to whether the determined area is a pixel. If the determined area is a pixel, the process moves to step 3307 where a specific sub-pixel of the determined pixel is determined to embed the EIC pattern. At step 3309, the position data and/or metadata information is embedded in the specific sub-pixel of the determined pixel. Such a sub-pixel may be the red channel sub-pixel of a pixel. Proceeding to step 3311, the grey value of the sub-pixel of the determined pixel may be changed based upon a background color of an underlying image currently displayed on the LCD screen. The process then moves to step 3317.

If the determined area is not a pixel in step 3305, the process moves to step 3313 where the position data and/or metadata information is embedded in a portion of the black matrix of the grid itself. Such a portion may be an edge that separates two sub-pixels of one pixel or two sub-pixels of two different pixels. Proceeding to step 3315, the grey value of the portion of the grid may be changed based upon a background color of an underlying image currently displayed on the LCD screen. The process then moves to step 3317. At step 3317, an orientation of the EIC pattern is determined. Moving to step 3319, the position data and/or metadata information is decoded and the process ends.

Figure 34:
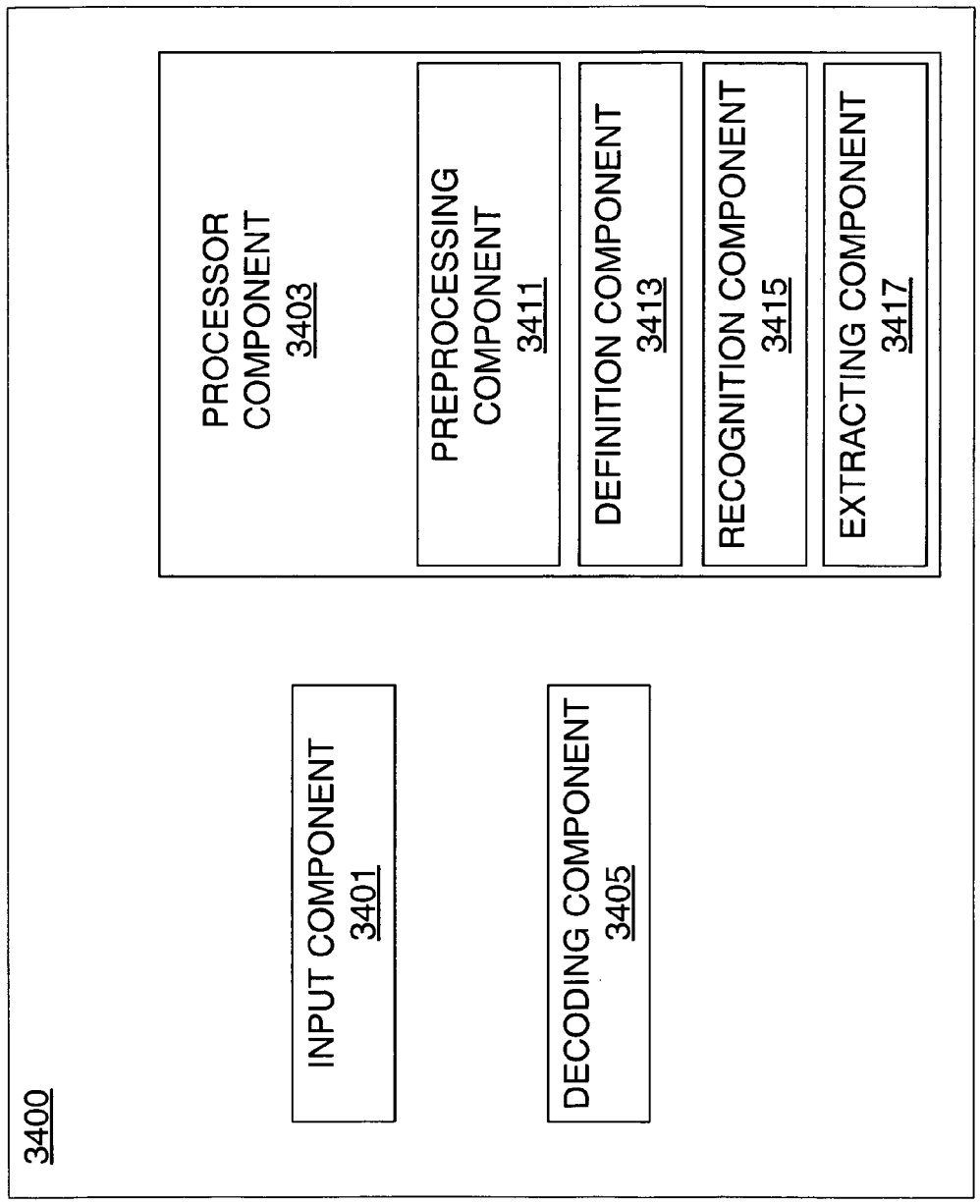
FIG. 34 is an illustrative block diagram of a system for decoding an EIC pattern on an LCD in accordance with at least one aspect of the present invention.

Illustrative components for a system 3400 for decoding an EIC pattern on an LCD is shown in FIG. 34. System 3400 is shown to include an input component 3401, a processor component 3403, and a decoding component 3405. Input component 3401 may be configured to receive captured images. Decoding component 3405 may be configured to decode position data and/or metadata information from an extracted bit stream to determine a position of the capture images with respect to a screen of the LCD. Processor component 3403 may be configured to process the captured images and output an extracted bit stream.

Processor component may be configured to include a preprocessing component 3411, a definition component 3413, a recognition component 3415, and an extracting component 3417. Preprocessing component 3411 may be configured to determine pixels corresponding to LCD pixel grids associated with the EIC pattern. Definition component 3413 may be configured to define the LCD pixel grids based upon the determined pixels. Recognition component 3415 may be configured to recognize the EIC pattern from the LCD pixel grids, and extracting component 3417 may be configured to extract a bit stream of EIC bits based upon the recognized EIC pattern.

Preprocessing component 3411 may further be configured to include a pixel separator, a binary erosion component, a separation component, a mask definer, and a mask merger. The pixel separator may be configured to separate pixels that lie on edges and vertexes of the LCD pixel grids as a first mask. The binary erosion component may be configured to erode the first mask to obtain a second mask, the second mask including fewer pixels than the first mask. The separation component may be configured to separate connected regions of the second mask in accordance with a first threshold to obtain a third mask and a fourth mask. The mask definer may be configured to define a sixth mask as pixels that belong to regions of the fifth mask, and the mask merger may be configured to merge the third and the sixth masks to define the LCD pixel grids. The binary erosion component may be further configured to erode the fourth mask to obtain a fifth mask, and a second threshold may be defined to correspond to a region of the fifth mask.

Recognition component 3415 may further be configured to include an orientation component, an alignment retriever, and a calculation component. The orientation component may be configured to determine an orientation of the EIC pattern in the captured image. The alignment retriever may be configured to retrieve horizontal and vertical alignment information for the orientation, and the calculation component may be configured to calculate EIC bits for the EIC pattern.

FIG. 35 is an illustrative method for decoding an EIC pattern on an LCD in accordance with at least one aspect of the present invention. The process starts at step 3501 where a captured image is received by the system. At step 3503, the captured image is processed to output an extracted bit stream. At step 3505, position data and/or metadata information is decoded from the extracted bit stream. Proceeding to step 3507, a position of the captured image with respect to a screen of an LCD is determined and the process ends.

FIG. 36 provides an illustrative method for step 3503 shown in FIG. 35 in accordance with at least one aspect of the present invention. The process starts at step 3601 where the captured image is preprocessed to determine pixels corresponding to LCD pixel grids associated with the EIC pattern. At step 3603, the LCD pixel grids are defined based upon the pixels. Moving to step 3605, the EIC pattern is recognized from the LCD pixel grids. A bit stream of EIC bits based upon the recognized EIC pattern is extracted at step 3607 and the process ends.

Figure 37:
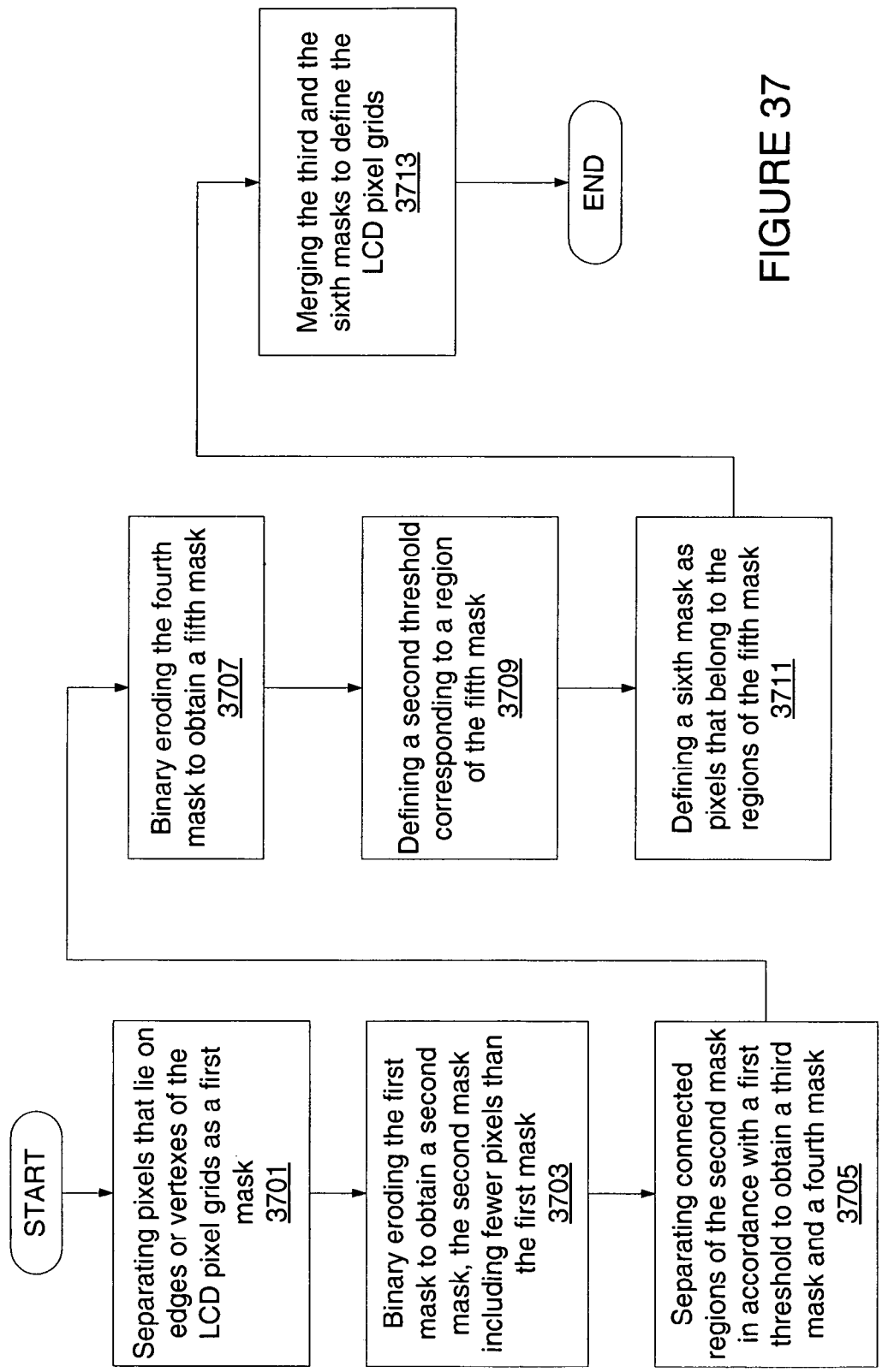

FIG. 37 provides an illustrative method for step 3601 shown in FIG. 36 in accordance with at least one aspect of the present invention. The process starts at step 3701 where pixels that lie on edges or vertexes of the LCD grids are separated as a first mask. At step 3703, a binary erosion operation is performed on the first mask to obtain a second mask. In this step, fewer pixels remain in the second mask compared to the first mask. Proceeding to step 3705, connected regions of the second mask are separated in accordance with a first threshold to obtain a third mask and a fourth mask. Another binary erosion operation is performed at step 3707 on the fourth mask to obtain a fifth mask. Moving to step 3709, a second threshold corresponding to a region of the fifth mask is defined. At step 3711, a sixth mask is defined as pixels that belong to the regions of the fifth mask. Finally, at step 3713, the third and the sixth masks are merged to define the LCD pixel grids and the process ends.

With respect to an application programming interface (API), various aspects of the present invention may be performed by an API. For example, public APIs may interface with an operating system to allow the operating system to provide the various features of the present invention. In one illustrative embodiment, a software architecture for processing data representative of positioning information on an LCD screen and/or metadata information may include a component configured to recognize the position of an input device with respect to an area of an LCD screen and an application program interface to access the component. An API may receive a request to recognize the position of an input device, access the necessary function(s) to perform the operation, and then send the results back to an operating system. The operating system may use the data provided from the API to perform the various features of the present invention. In another embodiment, the component may be configured to process a captured image to output an extracted bit stream, to decode position data and/or metadata information from the extracted bit stream, and to determine a position of the captured image with respect to a screen of an LCD.

As can be appreciated by one skilled in the art, a computer system with an associated computer-readable medium containing instructions for controlling the computer system can be utilized to implement the illustrative embodiments that are disclosed herein. The computer system may include at least one computer such as a microprocessor, digital signal processor, and associated peripheral electronic circuitry.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive of the present invention.

We claim:

1. A method for decoding an embedded interaction code (EIC) pattern on a liquid crystal display (LCD), the method comprising steps of:
  receiving a captured image;
  processing the captured image to output an extracted bit stream; and
  decoding position data from the extracted bit stream;
  determining a position of the captured image with respect to a screen of the LCD based upon the decoded position data;
  wherein the step of processing includes steps of,
    preprocessing the captured image to determine pixels corresponding to LCD pixel grids associated with the EIC pattern;
    defining the LCD pixel grids based upon the pixels;
    recognizing the EIC pattern from the LCD pixel grids;
    extracting a bit stream of EIC bits based upon the recognized EIC pattern to obtain the extracted bit stream;
  wherein the step of preprocessing includes steps of,
    separating pixels that lie on edges and vertexes of the LCD pixel grids as a first mask;
    binary eroding the first mask to obtain a second mask, the second mask including fewer pixels than the first mask;
    separating connected regions of the second mask in accordance with a first threshold to obtain a third mask and a fourth mask;
    binary eroding the fourth mask to obtain a fifth mask;
    defining a second threshold corresponding to a region of the fifth mask;
    defining a sixth mask as pixels that belong to the regions of the fifth mask; and
    merging the third and the sixth masks to define the LCD pixel grids.

2. The method of claim 1, wherein pixels that lie on edges or vertexes of the LCD pixel grids have a mask value of 1.

3. The method of claim 2, wherein the step of binary eroding the first mask includes steps of:
  for each pixel of the first mask with a mask value of 1, determining whether at least three neighboring pixels of the pixel have a mask value of 1, and
  assigning a mask value of 1 to the pixel in the second mask when the pixel and at least three neighboring pixels have a mask value of 1.

4. The method of claim 1, wherein the step of separating connected regions of the second mask includes steps of:
  for each pixel of the second mask determining whether the pixel belongs to a first region or a second region based upon the first threshold, and
  assigning a mask value of 1 to the pixel in the third mask and a mask value of 0 to the pixel in the fourth mask when the pixel belongs to the first region.

5. The method of claim 4, wherein the step of separating connected regions of the second mask further includes a step of assigning a mask value of 0 to the pixel in the third mask and a mask value of 1 to the pixel in the fourth mask when the pixel belongs to the second region.

6. The method of claim 1, wherein the step of binary eroding the fourth mask includes steps of:
for each pixel of the fourth mask with a mask value of 1, determining whether at least three neighboring pixels of the pixel have a mask value of 1, and
assigning a mask value of 1 to the pixel in the fifth mask when the pixel and at least three neighboring pixels have a mask value of 1.

7. A software architecture stored on one or more computer readable storage media for processing data representative of an embedded interaction code pattern, comprising:
at least one component configured to process a captured image to output an extracted bit stream, to decode position data from the extracted bit stream, and to determine a position of the captured image with respect to a screen of an LCD; and
at least one application program interface to access the component
wherein the at least one component is further configured to preprocess the captured image to determine pixels corresponding to LCD pixel grids associated with the EIC pattern, to define the LCD pixel grids based upon the pixels, to recognize the EIC pattern from the LCD pixel grids, to extract a bit stream of EIC bits based upon the recognized EIC pattern, to separate pixels that lie on edges and vertexes of the LCD pixel grids as a first mask, to binary erode the first mask to obtain a second mask, the second mask including fewer pixels than the first mask, to separate connected regions of the second mask in accordance with a first threshold to obtain a third mask and a fourth mask, to binary erode the fourth mask to obtain a fifth mask, to define a second threshold corresponding to a region of the fifth mask, to define a sixth mask as pixels that belong to the regions of the fifth mask, and to merge the third and the sixth masks to define the LCD pixel grids.

8. A computer-readable storage medium containing instructions for decoding an embedded interaction code (EIC) pattern on a liquid crystal display (LCD), by a method comprising:
receiving a captured image;
processing the captured image to output an extracted bit stream; and
decoding position data from the extracted bit stream;
determining a position of the captured image with respect to a screen of the LCD based upon the decoded position data;
wherein the step of processing includes steps of,
preprocessing the captured image to determine pixels corresponding to LCD pixel grids associated with the EIC pattern;
defining the LCD pixel grids based upon the pixels;
recognizing the EIC pattern from the LCD pixel grids; and
extracting a bit stream of EIC bits based upon the recognized EIC pattern to obtain the extracted bit stream; and
wherein the step of preprocessing includes steps of,
separating pixels that lie on edges and vertexes of the LCD pixel grids as a first mask;
binary eroding the first mask to obtain a second mask, the second mask including fewer pixels than the first mask;
separating connected regions of the second mask in accordance with a first threshold to obtain a third mask and a fourth mask;
binary eroding the fourth mask to obtain a fifth mask;
defining a second threshold corresponding to a region of the fifth mask;
defining a sixth mask as pixels that belong to the regions of the fifth mask; and
merging the third and the sixth masks to define the LCD pixel grids.

9. The computer-readable storage medium of claim 8, wherein pixels that lie on edges or vertexes of the LCD pixel grids have a mask value of 1.

10. The computer-readable storage medium of claim 9, wherein the step of binary eroding the first mask includes steps of:
for each pixel of the first mask with a mask value of 1, determining whether at least three neighboring pixels of the pixel have a mask value of 1, and
assigning a mask value of 1 to the pixel in the second mask when the pixel and at least three neighboring pixels have a mask value of 1.

11. The computer-readable storage medium of claim 8, wherein the step of separating connected regions of the second mask includes steps of:
for each pixel of the second mask determining whether the pixel belongs to a first region or a second region based upon the first threshold, and
assigning a mask value of 1 to the pixel in the third mask and a mask value of 0 to the pixel in the fourth mask when the pixel belongs to the first region.

12. The computer-readable storage medium of claim 11, wherein the step of separating connected regions of the second mask further includes a step of assigning a mask value of 0 to the pixel in the third mask and a mask value of 1 to the pixel in the fourth mask when the pixel belongs to the second region.

13. The computer-readable storage medium of claim 8, wherein the step of binary eroding the fourth mask includes steps of:
for each pixel of the fourth mask with a mask value of 1, determining whether at least three neighboring pixels of the pixel have a mask value of 1, and
assigning a mask value of 1 to the pixel in the fifth mask when the pixel and at least three neighboring pixels have a mask value of 1.

* * * * *